US010992002B2

(12) United States Patent
Kim et al.

(10) Patent No.: US 10,992,002 B2
(45) Date of Patent: Apr. 27, 2021

(54) SECONDARY BATTERY

(71) Applicant: UNIST(ULSAN NATIONAL INSTITUTE OF SCIENCE AND TECHNOLOGY), Ulsan (KR)

(72) Inventors: Young sik Kim, Ulsan (KR); Jae Kwang Kim, Ulsan (KR); Mooyoung Jung, Ulsan (KR); Jin Hyup Han, Ulsan (KR); Jeong Sun Park, Ulsan (KR)

(73) Assignee: UNIST(ULSAN NATIONAL INSTITUTE OF SCIENCE AND TECHNOLOGY), Ulsan (KR)

( * ) Notice: Subject to any disclaimer, the term of this patent is extended or adjusted under 35 U.S.C. 154(b) by 375 days.

(21) Appl. No.: 15/162,753

(22) Filed: May 24, 2016

(65) Prior Publication Data
US 2016/0268661 A1    Sep. 15, 2016

Related U.S. Application Data

(63) Continuation-in-part of application No. PCT/KR2014/011492, filed on Nov. 27, 2014.

(30) Foreign Application Priority Data

Nov. 27, 2013   (KR) .................. 10-2013-0145302

(51) Int. Cl.
*H01M 10/054*    (2010.01)
*H01M 10/0562*   (2010.01)
(Continued)

(52) U.S. Cl.
CPC ............. *H01M 12/08* (2013.01); *H01M 4/13* (2013.01); *H01M 4/133* (2013.01); *H01M 4/587* (2013.01);
(Continued)

(58) Field of Classification Search
None
See application file for complete search history.

(56) References Cited

U.S. PATENT DOCUMENTS

2006/0172165 A1 *  8/2006  Medeiros ............... H01M 4/40
                                                          429/405
2010/0323264 A1 * 12/2010  Chiang ............... B60L 11/1816
                                                          429/449

(Continued)

FOREIGN PATENT DOCUMENTS

JP    2011-009202    1/2011
JP    2013-171798    9/2013

(Continued)

OTHER PUBLICATIONS

Ponrouch, et al, High Energy Density Na-Ion Batteries Through Electrolyte Optimization, Abstract #383, 224th ECS Meeting (Year: 2013).*

(Continued)

*Primary Examiner* — Yoshitoshi Takeuchi
(74) *Attorney, Agent, or Firm* — Studebaker & Brackett PC

(57) ABSTRACT

The present invention relates to a rechargeable battery, and a rechargeable battery including: a liquid cathode portion including a sodium-containing solution and a cathode current collector impregnated in the sodium-containing solution; an anode portion including a liquid organic electrolyte, an anode current collector impregnated in the liquid organic electrolyte, and an anode active material provided in the surface of the anode current collector; and a solid electrolyte provided between the cathode portion and the anode portion can be provided.

19 Claims, 26 Drawing Sheets

(51) Int. Cl.
*H01M 10/0569* (2010.01)
*H01M 10/0568* (2010.01)
*H01M 8/1016* (2016.01)
*H01M 8/10* (2016.01)
*H01M 8/1009* (2016.01)
*H01M 12/08* (2006.01)
*H01M 4/13* (2010.01)
*H01M 6/34* (2006.01)
*H01M 4/133* (2010.01)
*H01M 4/587* (2010.01)
*H01M 4/62* (2006.01)
*H01M 4/66* (2006.01)
*H01M 4/96* (2006.01)
*H01M 4/48* (2010.01)
*H01M 4/60* (2006.01)
*H01M 4/04* (2006.01)
*H01M 4/1393* (2010.01)
*H01M 4/88* (2006.01)
*H01M 4/02* (2006.01)
*H01M 4/86* (2006.01)

(52) U.S. Cl.
CPC ........... *H01M 4/623* (2013.01); *H01M 4/625* (2013.01); *H01M 4/669* (2013.01); *H01M 4/96* (2013.01); *H01M 6/34* (2013.01); *H01M 8/1009* (2013.01); *H01M 8/1016* (2013.01); *H01M 10/054* (2013.01); *H01M 10/0562* (2013.01); *H01M 10/0568* (2013.01); *H01M 10/0569* (2013.01); *H01M 4/0404* (2013.01); *H01M 4/1393* (2013.01); *H01M 4/483* (2013.01); *H01M 4/60* (2013.01); *H01M 4/8846* (2013.01); *H01M 2004/027* (2013.01); *H01M 2004/8689* (2013.01); *H01M 2300/0028* (2013.01)

(56) References Cited

U.S. PATENT DOCUMENTS

| | | |
|---|---|---|
| 2012/0009469 A1 | 1/2012 | Visco |
| 2012/0258345 A1* | 10/2012 | Zaffou ................ H01M 4/8605 429/105 |
| 2014/0065456 A1* | 3/2014 | Bhavaraju ............ H01M 10/36 429/81 |
| 2014/0076730 A1* | 3/2014 | Kim ...................... H01M 4/381 205/99 |

FOREIGN PATENT DOCUMENTS

| | | | |
|---|---|---|---|
| KR | 10-1993-0001528 | 3/1993 | |
| KR | 10-2007-0004670 | 1/2007 | |
| KR | 10-2012-0020962 | 3/2012 | |
| KR | 10-2013-0003758 | 1/2013 | |
| KR | 10-2013-0139440 | 12/2013 | |
| WO | 2013/134114 | 9/2013 | |
| WO | WO 2013/134114 * | 9/2013 | ............... C25B 1/14 |

OTHER PUBLICATIONS

Ponrouch, et al, In Search of an Optimized Electrolyte for Na-ion Batteries, 5 Energy Environ. Sci., 8572-83 (2012) (Year: 2012).*

* cited by examiner

SECONDARY BATTERY

CROSS-REFERENCE TO RELATED APPLICATION

This application claims priority to and the benefit of Korean Patent Application No. 10-2013-0145302 filed in the Korean Intellectual Property Office on Nov. 27, 2013, the entire contents of which are incorporated herein by reference.

BACKGROUND OF THE INVENTION

(a) Field of the Invention

The present invention relates to a rechargeable battery.

(b) Description of the Related Art

In general, batteries generate electrical energy by using an electrochemical reaction material for a cathode and an anode. Lithium rechargeable batteries generate electrical energy due to chemical potential changes during intercalation/deintercalation of lithium ions at positive and anodes.

The lithium rechargeable batteries include a material reversibly intercalating or deintercalating lithium ions during charge and discharge reactions as both positive and negative active materials, and are filled with an organic electrolyte or a polymer electrolyte between the positive and anodes.

However, the amount of lithium is limited throughout the world, and can be yielded through a difficult process from minerals and salt lakes.

Accordingly, a next generation rechargeable battery that can replace lithium is needed.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a rechargeable battery.

In one exemplary embodiment of the present invention, a rechargeable battery including: a liquid cathode portion including a sodium-containing solution and a cathode current collector impregnated in the sodium-containing solution; an anode portion including a liquid organic electrolyte, an anode current collector impregnated in the liquid organic electrolyte, and an anode active material provided in the surface of the anode current collector; and a solid electrolyte provided between the cathode portion and the anode portion is provided.

An inlet and an outlet of the sodium-containing solution may be provided in one side of the cathode portion.

The organic electrolyte in the anode portion may include a non-aqueous organic solvent and/or sodium salt.

The non-aqueous organic solvent may be an ester-based, ether-based, ketone-based, or alcohol-based solvent, an aprotic solvent, or a combination thereof.

The sodium salt may be $NaClO_4$, $NaPF_4$, $NaPF_6$, $NaAsF_6$, NaTFSI, $Na[(C_2F_5)_3PF_3]$ (NaFAP), $Na[B(C_2O_4)_2]$(NaBOB), $Na[N(SO_2F)_2]$(NaFSI), Na Beti ($NaN[SO_2C_2F_5]_2$), or a combination thereof.

An anode active material layer provided in the surface of the anode current collector may include an anode active material, a conductive material, and/or a binder, and the anode active material comprises an n-type organic material, a Cu-based, P-based, Sn-based, carbon-based material, and/or a sodium intercalation material.

The n-type organic material may be aniline/o-nitroaniline, disodium terephthalate, aromatic dialdehyde, terephthalaldehyde, 3,4,9,10-perylene-tetracarboxylicacid-dianhydride (PTCDA), poly (2,2,6,6-tetramethylpiperidinyloxy-4-yl-methacrylate) (PTMA), or a derivative or mixture thereof.

The Cu-based, P-based, and Sn-based material may be CuO, CuO/C, P, P/C, Sn, Sn/C, Sn/P, or a combination thereof.

The carbon-based material may be natural graphite, artificial graphite, soft carbon, hard carbon, or a combination thereof.

The sodium intercalation material may be $Li_4Ti_5O_{12}$, $NaCo_2O_4$, $Na_2Ti_3O_7$, $Fe_3O_4$, $TiO_2$, $Sb_2O_4$, a Sb/C composite, a SnSb/C composite, amorphous P/C composite, or a combination thereof.

The conductive material may be a carbon-based material such as natural graphite, artificial graphite, carbon black, acetylene black, ketjen black, vapor-grown carbon fiber (VGCF), or carbon fiber, a metal powder such as copper, nickel, aluminum, or silver, or metal fiber, a conductive polymer, or a mixture thereof.

The binder may be polyvinyl alcohol, carboxymethyl cellulose, hydroxypropylcellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acrylated styrene-butadiene rubber, an epoxy resin, nylon, or a combination thereof.

The solid electrolyte may include an amorphous ion conductive material (phosphorus-based glass, oxide-based glass, oxide/sulfide based glass), a Na superionic conductor (NASICON), a sodium sulfide-based solid electrolyte, a sodium oxide-based solid electrolyte, a $PEO-NaClO_4$ polymer solid electrolyte, or a combination thereof.

The cathode current collector may be carbon paper, carbon fiber, carbon fabric, carbon felt, metal membrane, or a combination thereof A porosity range of the cathode current collector may be 1 μm to 250 μm.

Reaction Equation 1 and/or Reaction Equation 2 occurs in the cathode portion when the rechargeable battery is discharged:

$$Na^+ + H_2O + e^- \rightarrow NaOH + \tfrac{1}{2}H_2 \quad \text{[Reaction Equation 1]}$$

$$Na^+ + \tfrac{1}{2}H_2O + \tfrac{1}{4}O_2 + e^- \rightarrow NaOH \quad \text{[Reaction Equation 2]}$$

Reaction Equation 3 and/or Reaction Equation 4 occur in the cathode portion when the rechargeable battery is charged:

$$NaCl \rightarrow Na + \tfrac{1}{2}Cl_2 \quad \text{[Reaction Equation 3]}$$

$$NaOH \rightarrow Na + \tfrac{1}{2}H_2O + \tfrac{1}{4}O_2 \quad \text{[Reaction Equation 4]}$$

The sodium-containing solution may be seawater.

The rechargeable battery may further include a fresh water exhaust portion connected to the cathode portion to draw out fresh water generated in the cathode portion to the outside.

The fresh water exhaust portion may include an exhaust pipe provided in a cathode portion where a sodium-containing solution is received and selectively opened to exhaust fresh water while or after the battery is charged.

The rechargeable battery may further include a hydrogen exhaust portion connected to the cathode portion to draw out hydrogen generated in the cathode portion from discharge of the battery to the outside.

The hydrogen exhaust portion may include a gas pipe provided in an upper end of the cathode portion where a sodium-containing solution is received and selectively opened while or after the battery is discharged so as to exhaust hydrogen.

According to the present invention, a rechargeable battery that uses sodium ion in a sodium-containing solution can be provided. More specifically, the sodium-containing solution may be sweater or salt water.

DETAILED DESCRIPTION OF THE EMBODIMENTS

Hereinafter, embodiments of the present invention are described in detail. However, these embodiments are exemplary, the present invention is not limited thereto, and the present invention is defined by the scope of claims.

In one embodiment of the present invention, a rechargeable battery including: a liquid cathode portion including a sodium-containing solution and a cathode current collector impregnated in the sodium-containing solution; an anode portion including a liquid organic electrolyte, an anode current collector impregnated in the liquid organic electrolyte; and a solid electrolyte provided between the cathode portion and the anode portion.

Figure 1:
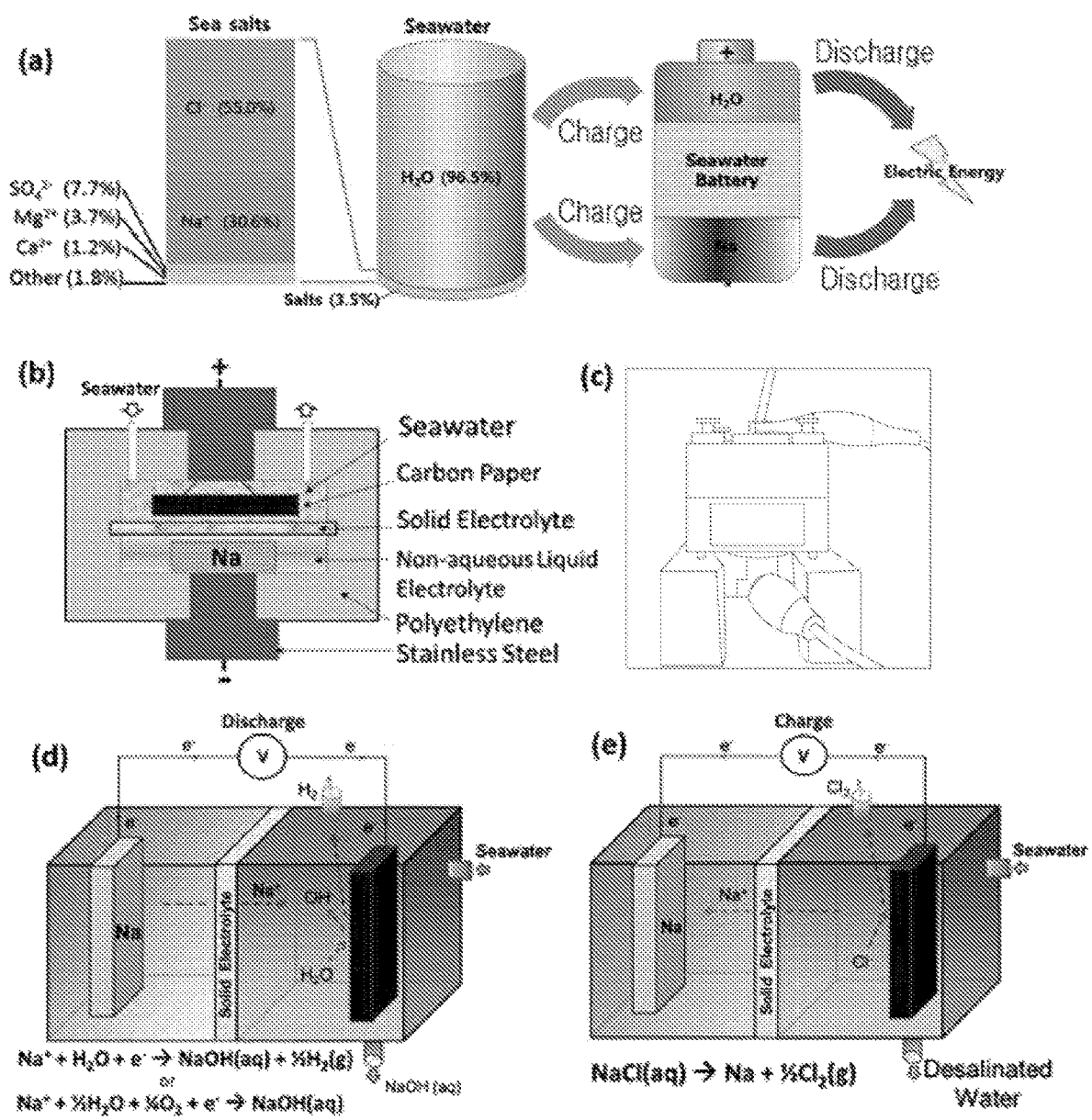
FIG. 1 is a schematic diagram of a rechargeable battery according to Exemplary Embodiment 1 of the present invention.

FIG. 1 is a schematic diagram of a rechargeable battery according to an exemplary embodiment of the present invention. In FIG. 1, seawater is illustrated as an example of the sodium-containing solution. Hereinafter, the exemplary embodiment of the present invention will be described with reference to FIG. 1.

FIG. 1(a) shows a schematic principle of a rechargeable battery, and it can be observed through FIG. 1 that the rechargeable battery according to the exemplary embodiment of the present invention is driven using a potential difference according to concentration change of sodium ion in the sodium-containing solution (e.g., seawater).

FIG. 1(b) and FIG. 1(c) are a schematic diagram and a photo illustrating performance of a charge/discharge experiment using Na as a counter electrode to an anode. Further, FIG. 1(d) and FIG. 1(e) are schematic diagrams illustrating a chemical reaction in charge/discharge of a half cell using a Na as a counter electrode to the anode. In the above structure, the anode may be replaced with an anode having a new structure that includes an anode active material.

In the rechargeable battery according to the exemplary embodiment of the present invention, Reaction Formula 1 or Reaction Formula 2 may occur in the cathode portion during discharge.

[Reaction Equation 1]

[Reaction Equation 2]

In addition, Reaction Formula 3 or Reaction Formula 4 may occur in the cathode portion during charge of the rechargeable battery according to the exemplary embodiment of the present invention.

[Reaction Equation 3]

[Reaction Equation 4]

In addition to Reaction Equation 1 to 3, additional reactions may occur, but a reaction that significantly affects driving of the rechargeable battery may the above-stated three reaction equations.

The battery may be charged or discharged from the reaction. Since the battery having such a structure uses sodium as an energy source instead of lithium, the battery may be a next generation replacement after lithium.

In addition, it is expected that the battery can also be charged/discharged using a body fluid of human, having a similar composition of a sodium-containing solution (e.g., seawater). In such a case, application fields may be variously expanded.

In one side of the cathode portion, an inlet of the sodium-containing solution and an outlet of the sodium-containing solution may be provided. Thus, the sodium-containing solution can be continuously supplied in the cathode portion.

The rechargeable battery according to the exemplary embodiment of the present invention may further include a fresh water exhaust portion connected to the cathode portion and through which fresh water generated from the cathode portion is drawn out to the outside. FIG. 12 to FIG. 16 schematically illustrates a rechargeable battery that further includes the fresh water exhaust portion. In detail, the rechargeable battery that further includes the fresh water exhaust portion includes: a cathode portion 10 including a sodium-containing solution and a cathode current collector 12 impregnated to the sodium-containing solution; an anode portion 20 including a liquid organic electrolyte and an anode 20 impregnated to the liquid organic electrolyte and provided with an anode active material layer; a solid electrolyte 30 provided between the cathode portion 10 and the anode portion 20; and a fresh water exhaust portion 40 connected with the cathode portion 10 and through which fresh water generated from the cathode portion 10 by charging of the rechargeable battery is drawn out to the outside.

Figure 13:
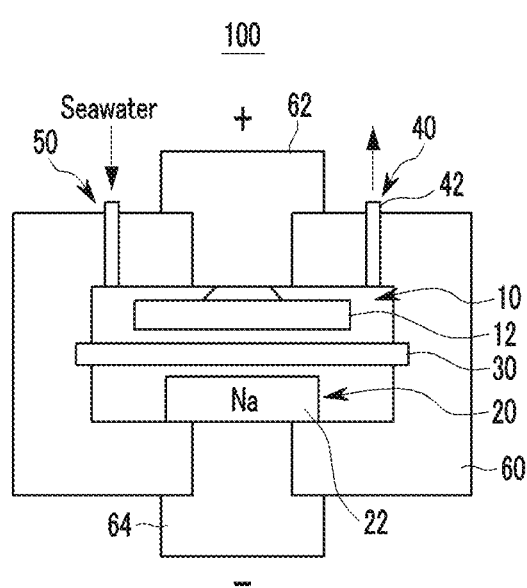
FIG. 13 and FIG. 14 illustrate schematically configurations of the rechargeable battery according to Exemplary Embodiment 2 of the present invention.
Figure 14:
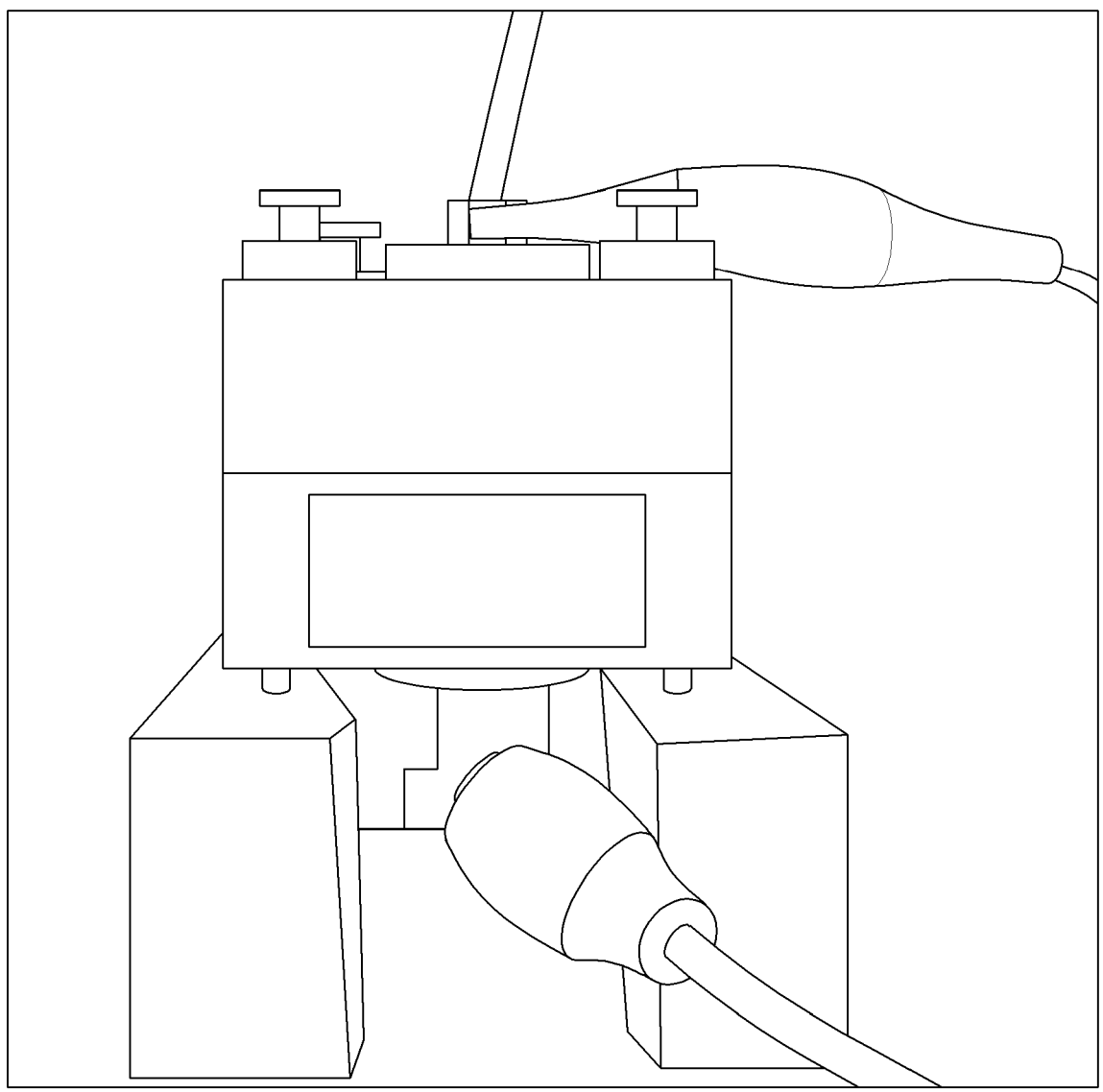

In FIG. 13, reference numeral 60 denotes a body that forms an outer shape of the rechargeable battery. The body 60 receives the cathode portion 10 and the anode portion 20 therein and electrically insulates the cathode portion 10 and the anode portion 20. The body 60 may be made of, for example, a polyethylene material. The shape or the material of the body 60 is not restrictive.

The cathode portion 10 may include a cathode terminal 62 electrically connected with the cathode current collector 12 and extended to an outer side of the body 60. The cathode terminal 62 may be made of a metallic material such as stainless steel and the like.

The anode portion 20 may be provided with an anode terminal 64 electrically connected with an anode 22 and extended to an outer side of the body 60.

The negative terminal 64 may be separately provided with the anode 22 and thus may be electrically connected with the negative terminal 62. In addition to the above-stated structure, an anode current collector that forms a negative terminal may be extended to an outer side of the body 60 and thus may be served as a negative terminal.

The fresh water exhaust portion 40 is provided in the cathode portion 10 where the sodium-containing solution and selectively opened/closed while or after being charged of the battery so as to exhaust fresh water.

Figure 15:
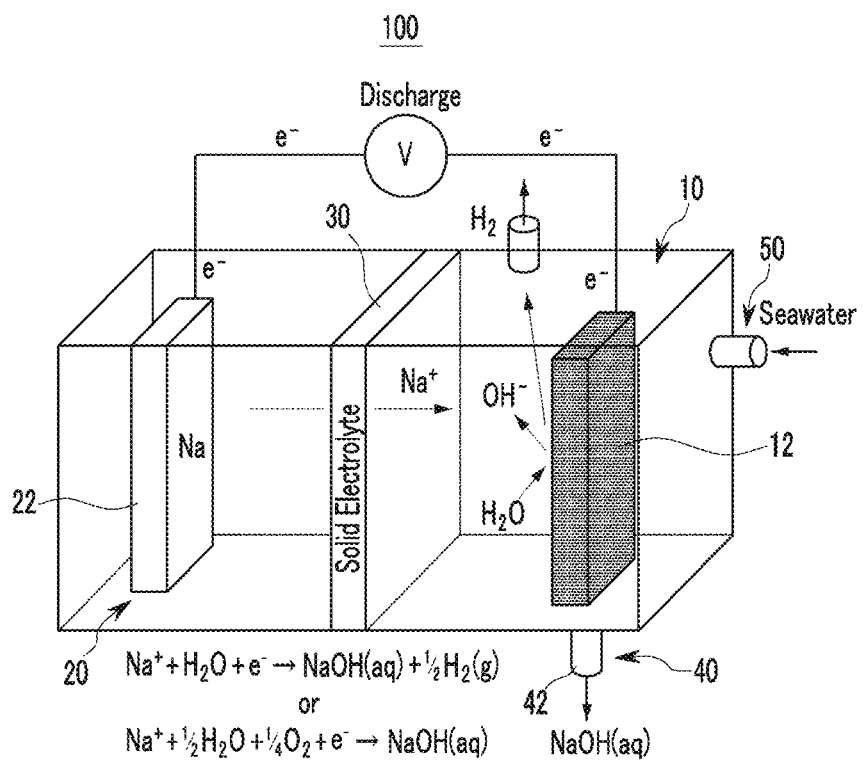
FIG. 15 and FIG. 16 are provided for description of operation of the rechargeable battery according to Exemplary Embodiment 2 of the present invention.
Figure 16:
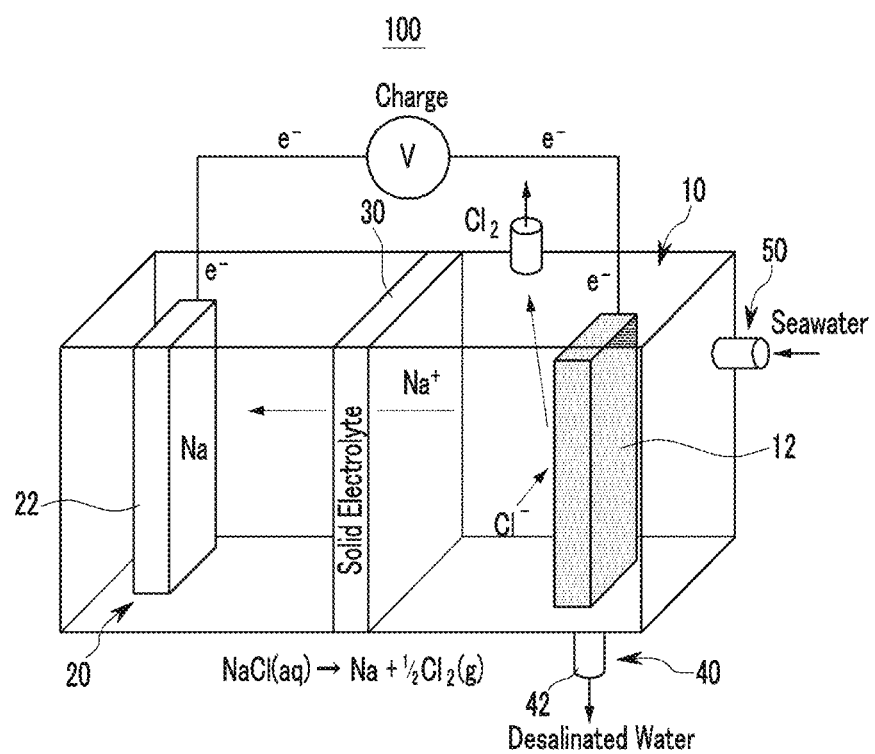

FIG. 15 and FIG. 16 schematically illustrate charge and discharge operation of the rechargeable battery that further includes the fresh water exhaust portion. In the above-stated structure, the anode portion 20 may have a new structure including an anode active material. As previously described, an inlet 50 of the sodium containing solution may be connected to one side of the cathode portion 10. In addition, an outlet through which the sodium-containing solution is exhausted to the outside may be provided separately from the inlet 50 in the cathode portion 10. The inlet 50 and the outlet provided in the cathode portion 10 enable continuous supply of the sodium-containing solution to the cathode portion 10.

As shown in FIG. 15 and FIG. 16, in the rechargeable battery 100 that further includes the fresh water exhaust portion 40, sodium in the cathode portion 10 moves to the anode portion 20 and then eliminated therein due to a reaction equation occurring in the cathode portion 10 when the rechargeable battery 100 is being charged. Accordingly, the sodium-containing solution received in the cathode portion 10 is changed to fresh water. When the rechargeable battery 100 is charged and thus sodium in the cathode portion 10 is wholly eliminated, the fresh water exhaust portion 40 connected to the cathode portion 10 and thus fresh water in the cathode portion 10 may be drawn out to the outside.

The fresh water exhaust portion 40 may include an exhaust pipe 42 provided in a lower end of the cathode portion 10 and thus being selectively opened or closed. The rechargeable battery further including the fresh water exhaust portion may have a structure in which the outlet provided for circulation of sodium to the cathode portion may be used as a fresh water exhaust portion and fresh water may be drawn out through the outlet as necessary.

As described, the rechargeable battery that further includes the fresh water exhaust portion provides electric energy through charge/discharge of the rechargeable battery and provides fresh water by charging seawater to fresh water when being charged.

The rechargeable battery according to the exemplary embodiment of the present invention may further include a hydrogen exhaust portion connected to the cathode portion to exhaust hydrogen generated from the cathode portion while being discharged.

The hydrogen exhaust portion is provided in an upper end of the cathode portion where the sodium-containing solution is received and selectively opened/closed while the battery is being discharged or after the batter is discharged so as to exhaust hydrogen.

Figure 24:
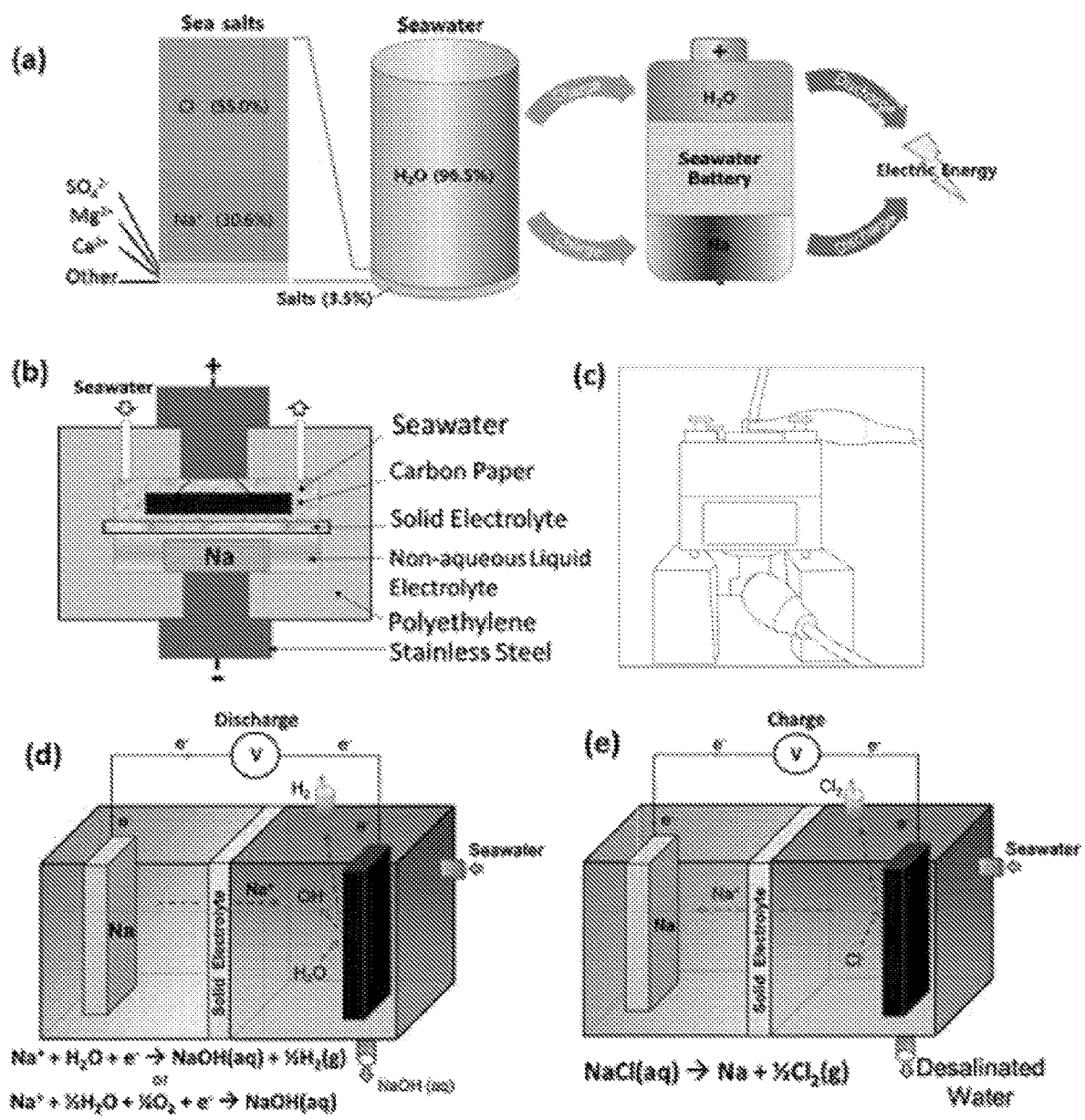
FIG. 24 is a schematic diagram of a rechargeable battery according to Exemplary Embodiment 3 of the present invention.

FIG. 24 is a schematic diagram of a rechargeable battery that further includes the above-stated hydrogen exhaust portion. FIG. 24 shows an exemplary embodiment of the present invention, and seawater will be used as a sodium-containing solution. Hereinafter, the rechargeable battery further including the hydrogen exhaust portion will be described with reference to FIG. 24.

FIG. 24(a) shows a schematic principle of the rechargeable battery that further includes the hydrogen exhaust portion, and it can be observed from FIG. 24(a) that the rechargeable battery that further includes the hydrogen exhaust portion is driven using a potential difference according to a change in concentration of sodium ion in the sodium containing solution (e.g., seawater).

FIGS. 24(b) and (c) are a schematic diagram and a photo of a charge/discharge experiment performed using Na as a counter electrode to an anode. In addition, FIGS. 24(d) and (e) are schematic diagrams illustrating a chemical reaction during charge/discharge of a half cell using NA as a counter electrode to the anode. In the above-stated structure, the anode may be replaced with an anode including an anode active material.

As described above, an inlet and an outlet of the sodium-containing solution may be provided in one side of the cathode portion. Through the inlet and the outlet, the sodium-containing solution can be continuously supplied to the cathode portion.

In the rechargeable battery further including the hydrogen exhaust portion, sodium is moved to the anode portion from the cathode portion due to a reaction equation occurred in the cathode portion while the rechargeable battery is being charged.

In addition, hydrogen ($H_2$) is generated from a reaction equation occurred in the cathode portion when the rechargeable battery is discharged. Hydrogen generated from the cathode portion is drawn out to the outside through the hydrogen exhaust portion.

The hydrogen exhaust portion may include a gas pipe provided in an upper end of the cathode portion and selectively opened/closed.

Thus, hydrogen generated from the cathode portion moves upward in the cathode portion and then drawn out to the outside through the gas pipe provided in the upper portion of the cathode portion.

As described, the rechargeable battery that further includes the hydrogen exhaust portion supplies electrical energy through charge/discharge, and hydrogen is generated in the cathode portion while being discharged and then provided to the outside.

The anode portion may include an organic electrolyte, and the organic electrolyte in the anode portion may include non-aqueous organic solvent and/or sodium salts.

The non-aqueous organic solvent serves as a medium for transmitting ions taking part in the electrochemical reaction of a battery.

The organic solvent may further include one selected from an ester-based, ether-based, ketone-based, or alcohol-based solvent, and an aprotic solvent. As the carbonate-based solvent, dimethyle carbonate (DMC), diethyle carbonate (DEC), dipropyl carbonate (DPC), methylepropyl carbonate (MPC), ethylepropyl carbonate (EPC), methyethyle carbonate (MEC), ethylene carbonate (EC), propylene carbonate (PC), butylene carbonate (BC), and the like may be used, and as the ester-based solvent, methyl acetate, ethyl acetate, n-propyl acetate, 1,1-dimethylethyl acetate, methyl propionate, ethyle propionate, γ-butyrolactone, decanolide, valerolactone, mevalonolacton, caprolactone, and the like may be used. As the ether-based solvent, dibutyl ether, tetraglyme, diglyme, dimethoxyethane, 2-methyltetrahydrofuran, tetrahydrofuran, and the like may be used, and cyclohexanone may be used as the ketone-based solvent. In addition, as the alcohol-based solvent, ethyl alcohol, isopropyl alcohol, and the like may be used, and nitriles such as R—CN (R denotes a linear, branched, or ring structured hydrocarbon group of C2 to C20, and may include a double-bonded aromatic ring or an ether bond) and the like, amides such as dimethylformamide and the like, dioxolanes such as 1,3-dioxolane and the like, and sulfolanes may be used as the aprotic solvent.

The non-aqueous organic solvent may be solely used or one or more may be mixed for use. When one or more are mixed, a mixing ratio can be appropriately controlled for a desired battery performance, and this can be readily understood by persons skilled in the art.

In addition, in case of the carbonate-based solvent, it is preferred to mix cyclic-type carbonate and chain-type carb. In this case, the electrolyte solution may have excellent performance if the cyclic-type carbonate and the chain-type carbonate are mixed with a volume ratio of about 1:1 to about 1:9.

The non-aqueous organic solvent may further include an aromatic hydrocarbon-based organic solvent in addition to the carbonate-based sol. In this case, the carbonate-based solvent and the aromatic hydrocarbon-based organic solvent may be mixed with a volume ratio of about 1:1 to about 30:1.

As the aromatic hydrocarbon-based organic solvent, an aromatic hydrocarbon-based organic solvent of Chemical Formula 1 may be used.

[Chemical Formula 1]

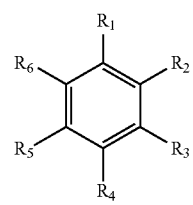

In Chemical Formula 1, $R_1$ to $R_6$ are independently hydrogen, halogen, C1 to C20 alkyl group, C1 to C20 haloalkyl group, or a combination thereof.

As the aromatic hydrocarbon-based organic solvent, benzene, fluoro benzene, 1,2-difluoro benzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-trichlorobenzene, iodobenzene, 1,2-diiodobenzenen, 1,3-diiodobenzene, 1,4-diiodobenzene, 1,2,3-triiodobenzene, 1,2,4-triiodobenzene, toluene, fluorotoluene, 1,2-difluorotoluene, 1,3-difluorotoluene, 1,4-difluorotoluene, 1,2,3-tridifluorotoluene, 1,2,4-tridifluorotoluene, chlorotoluene, 1,2-dichlorotoluene, 1,3-dichlorotoluene, 1,4-dichlorotoluene, 1,2,3-trichlorotoluene, 1,2,4-trichlorotoluene, iodotoluene, 1,2-diiodotoluene, 1,3-diiodotoluene, 1,4-diiodotoluene, 1,2,3-triidotolune, 1,2,4-triidotolune, xylene, or a combination thereof may be used.

In order to improve battery cycle-life, the non-aqueous electrolyte may further include vinylene carbonate or an ethylene carbonate-based compound of Chemical Formula 2.

[Chemical Formula 2]

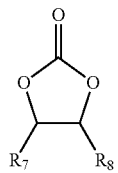

In Chemical Formula 2, $R_7$ and $R_8$ are independently hydrogen, a halogen group, a cyano group (CN), a nitro group ($NO_2$), a C1 to C5 fluoroalkyl group, and at least one of $R_7$ and $R_8$ is a halogen group, a cyano group (CN), a nitro group ($NO_2$), or a C1 to C5 fluoroalkyl group.

More specifically, examples of the ethylene carbonate-based compound may be difluoro ethylene carbonate, chloroethylene carbonate, dichloroethylene carbonate, bromoethylene carbonate, dibromoethylene carbonate, nitroethylene carbonate, cyanoethylene carbonate, or fluoroethylene carbonate. When the vinylene carbonate or ethylene carbonate-based compound is further used, their use amount may be appropriately controlled.

The sodium salt is dissolved in the non-aqueous organic solvent, supplies sodium ions in a battery, basically operates the rechargeable battery battery, and improves sodium ion transportation between positive and anodes therein.

More specifically, the sodium salt may be $NaClO_4$, $NaPF_4$, $NaPF_6$, $NaAsF_6$, NaTFSI, $Na[(C_2F_5)_3PF_3]$(NaFAP), $Na[B(C_2O_4)_2]$(NaBOB), $Na[N(SO_2F)_2]$(NaFSI), Na Beti ($NaN[SO_2C_2F_5]_2$), or a combination thereof.

Concentration of the sodium salt may be 0.001 to 10M, and more specifically, 0.1 to 2.0M. When the concentration of sodium salt is included in the above-stated range, an electrolyte may have excellent performance and sodium ion mobility due to optimal electrolyte conductivity and viscosity.

The anode active material layer provided in the surface of the anode current collector may include an anode active material, a conductive material, and/or a binder, and the anode active material may include an n-type organic material, a Cu-based, P-based, Sn-based, carbon-based material and/or a sodium intercalation material.

The n-type organic material may be aniline/o-nitroaniline, disodium terephthalate, aromatic dialdehyde, terephthalaldehyde, 3,4,9,10-perylene-tetracarboxylicacid-dianhydride (PTCDA), poly (2,2,6,6-tetramethylpiperidinyloxy-4-ylmethacrylate) (PTMA), or a derivative or mixture thereof. More specifically, the n-type organic material may be disodium terephthalate.

The Cu-based, P-based, and Sn-based materials may be CuO, CuO/C, P, P/C, Sn, Sn/C, Sn/P, or a combination thereof. More specifically, the Cu-based, P-based, and Sn-based materials may be Sn/C.

The carbon-based material may be natural graphite, artificial graphite, soft carbon, hard carbon, or a combination thereof. More specifically, the carbon-based material may be hard carbon.

The sodium intercalation material may be $Li_4Ti_5O_{12}$, $NaCo_2O_4$, $Na_2Ti_3O_7$, $Fe_3O_4$, $TiO_2$, $Sb_2O_4$, a Sb/C composite, a SnSb/C composite, amorphous P/C composite, or a combination thereof. More specifically, it may be $Li_4Ti_5O_{12}$.

The anode active material layer may include a binder, and may selectively further include a conductive material.

The binder makes the anode electrode active material particles attached to each other and attaches the anode electrode active material to the current collector, and as the binder, polyvinyl alcohol, carboxymethyl cellulose, hydroxypropylcellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acrylated styrene-butadiene rubber, an epoxy resin, nylon, and the like may be used, but it is not restrictive.

The conductive material is used to provide conductivity to an electrode, and any electronic conductive material that does not cause a chemical change in a battery can be used. For example, a carbon-based material such as natural graphite, artificial graphite, carbon black, acetylene black, ketjen black, carbon fiber, and the like, a metal powder such as copper, nickel, aluminum, silver, and the like, or a metal-based material such as metal fiber and the like, a conductive polymer such as a polyphenylene conductor and the like, or a conductive material including a mixture thereof may be used.

As the current collector, a copper film, a nickel film, a stainless steel film, a titanium film, a nickel form, a copper foam, a polymer material coated with a conductive metal or a combination thereof may be used.

The anode may be manufactured by mixing each active material, a conductive material, and a binder into an active material composition in a solvent and coating the composition on a current collector. Such a manufacturing method is well known to a person skilled in the art, and therefore no further detailed description will be provided. As the solvent, N-methylpyrrolidone may be used, but it is not restrictive.

The solid electrolyte is a material that can be stabilized with an aqueous solution and an organic solution and has fast sodium ion movement speed, and may include an amorphous ion conductive material (phosphorus-based glass, oxide-based glass, oxide/sulfide based glass), a Na superionic conductor (NASICON), a sodium sulfide-based solid electrolyte, a sodium oxide-based solid electrolyte, a $PEO-NaClO_4$ polymer solid electrolyte, or a combination thereof.

More specifically, the solid electrolyte may be NASICON, and in this case, ion conductivity can be further improved.

The cathode current collector included in the cathode portion may be carbon paper, carbon fiber, carbon fabric, carbon felt, metal membrane, or a combination thereof, and more specifically, it may be carbon paper. In case of the carbon paper, a by-product that can be generated from an oxidation/reduction reaction of other metal ion included in a sodium-containing solution can be minimized.

A porosity range of the cathode current collector may be 1 μm to 250 μm. When the above-stated range is satisfied, an electrode having side surface area is formed to induce much more electrode reactions.

Hereinafter, exemplary embodiments and comparative examples will be disclosed. The following exemplary embodiments are exemplary embodiments of the present invention, and the present invention is not limited thereto.

Exemplary Embodiment 1: Manufacturing of Rechargeable Battery

Manufacturing of Cathode Portion

Carbon paper (Fuel Cell Store, 2050-A) was used as a current collector. Seawater was injected into a cathode container and then the current collector was impregnated in the seawater such that a cathode portion was manufactured.

A porosity of the carbon paper was 28 μm.

Manufacturing of Anode Portion

Figure 2:
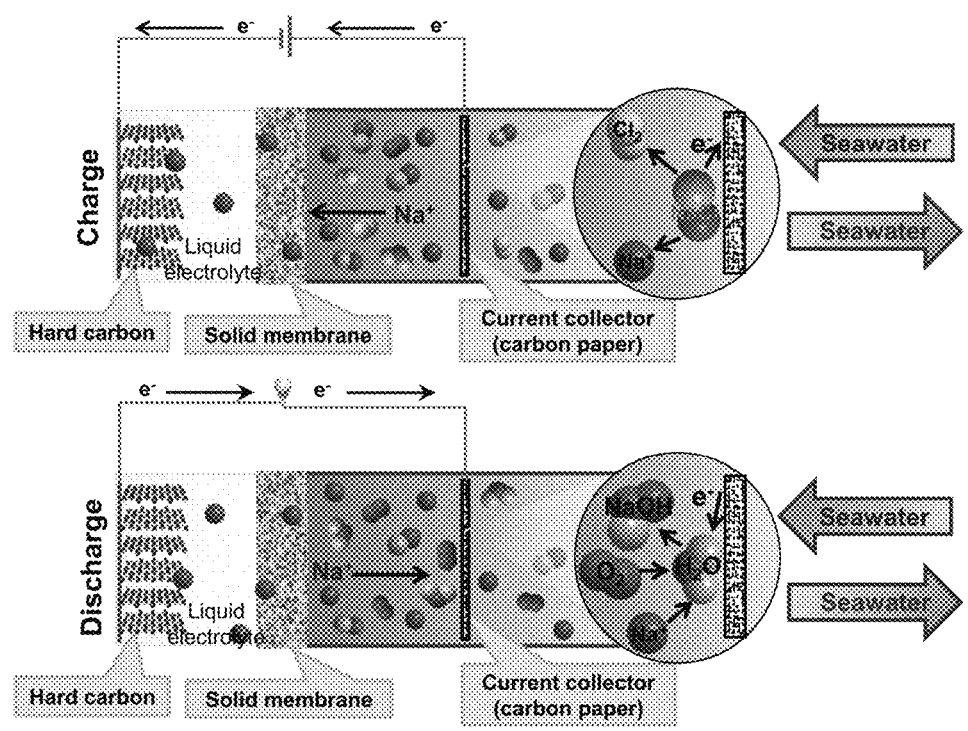
FIG. 2 is a schematic diagram of the rechargeable battery according to Exemplary Embodiment 1 of the present invention.

1) FIG. 2 is a schematic diagram of a seawater battery formed of a hard carbon anode. Stainless steel (McMASTER) was used as a current collector. On the current collector, hard carbon (MTI): super P carbon black (TIMCAL), which is a conductive material: poly (terofluoroethylene), which is a binder were mixed with a ratio of 70:20:10 (wt %) to form an anode active material layer such that an anode was manufactured.

An organic electrolyte is injected into an anode container and then the manufactured anode was impregnated therein.

Three of organic electrolytes were used, and the first organic electrolyte was manufactured by mixing ethylene carbonate (EC): diethylene carbonate (DEC) (1:1 volume ratio) and 1M of $NaClO_4$ sodium salt (Aldrich). The second organic electrolyte was manufactured by mixing ethylene carbonate (EC): propylene carbonate (PC) (1:1 volume ratio) and 1M of $NaClO_4$ sodium salt (Aldrich). The third organic electrolyte was manufactured by mixing 1M of $NaCF_3SO_3$ sodium to a tetraethylene glycol dimethyl ether (TEGDME) solvent.

A reaction equation of the seawater battery using hard carbon is as follows.

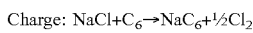

Charge: $NaCl+C_6 \rightarrow NaC_6+\frac{1}{2}Cl_2$

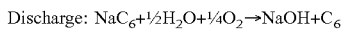

Discharge: $NaC_6+\frac{1}{2}H_2O+\frac{1}{4}O_2 \rightarrow NaOH+C_6$

Figure 3:
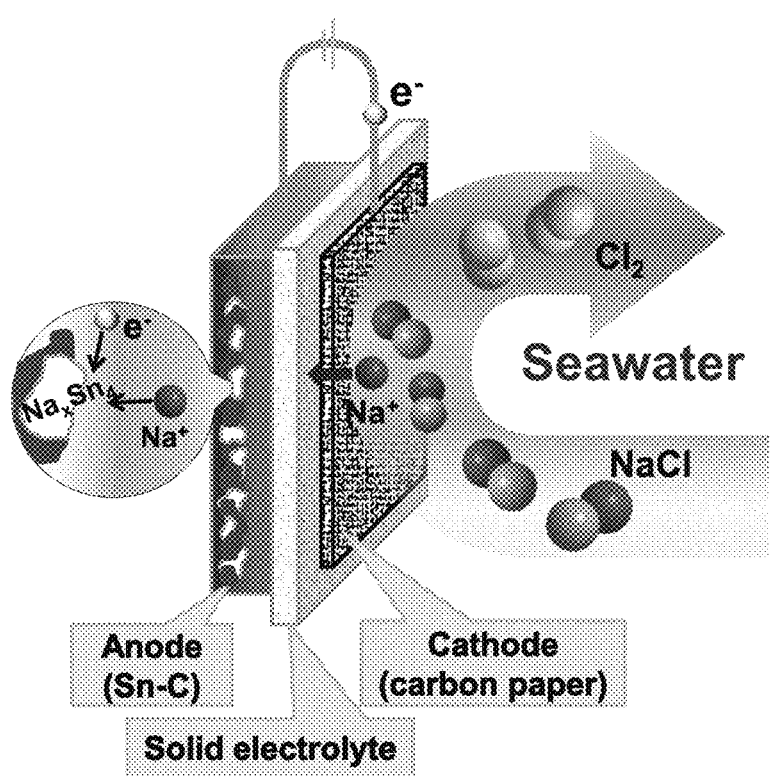
FIG. 3 is a schematic diagram of the rechargeable battery according to Exemplary Embodiment 1 of the present invention.

2) FIG. 3 is a schematic view of a seawater battery using a Sn—C as an anode. Nickel and copper were used as a current collector. A Sn—C or disodium terephthalate (DST) anode active material: super-P carbon: PVdF binder were mixed with a ratio of 80:10:10 together with a N-Methyl-2-pyrrolidone (NMP) solvent on the current collector such that an anode was manufactured. The organic electrolyte used in the anode portion is a liquid electrolyte formed by mixing 1M of $NaClO_4$ sodium salt (Aldrich) to an ethylene carbonate (EC):diethylene carbonate (DEC) (with 1:1 volume ratio) solvent.

A reaction equation of a seawater battery using Sn—C as an anode is as follows.

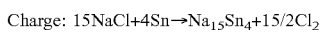

Charge: $15NaCl+4Sn \rightarrow Na_{15}Sn_4+15/2Cl_2$

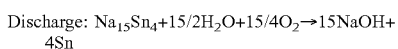

Discharge: $Na_{15}Sn_4+15/2H_2O+15/4O_2 \rightarrow 15NaOH+4Sn$

Manufacturing of Solid Electrolyte

NASICON ($Na_3Zr_2Si_2PO_{12}$) was used as a solid electrolyte. The solid electrolyte was manufactured through a solid-state reaction in the lab. The solid-state reaction is well known to the art and therefore no further description will be provided.

The solid electrolyte was placed between the cathode portion and the anode portion. The solid electrolyte has a thickness of about 1 mm.

Experimental Example 1: Battery Characteristic Evaluation

Charge and Discharge Characteristics Evaluation

Figure 4:
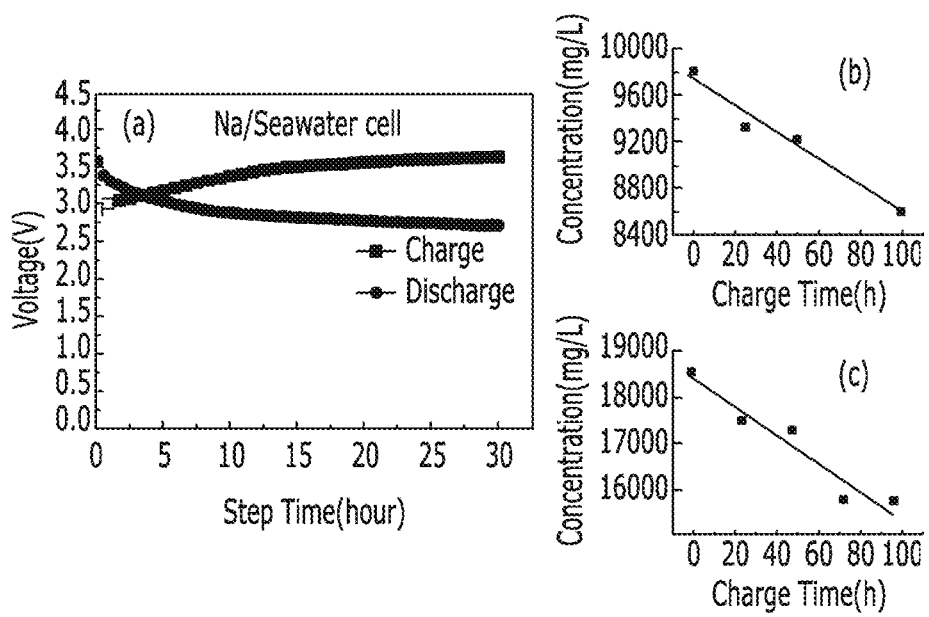
FIG. 4 shows voltage data of the battery and data variance of salt in seawater when the voltage is charged according to Exemplary Embodiment 1 of the present invention.
Figure 4:
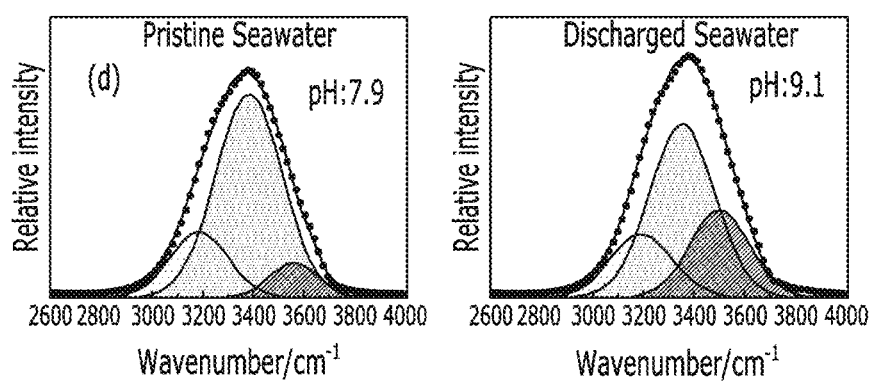

FIG. 4 shows variation data of voltage data of the battery according to Exemplary Embodiment 1 and salt in seawater when the battery is being discharged.

When the battery is charged, $Na^+$ ion is dispersed through a NASICON solid electrolyte and thus moves to the anode portion, and in this case, $Cl_2$ gas is generated.

When the battery is charged, generation of $O_2$ (E=3.94 V) gas is thermodynamically preferred than generation of $Cl_2$ (E=4.07 V) gas, but in the seawater battery of the above-stated exemplary embodiment, $Cl_2$ and $O_2$ both are generated.

Due to high over-potential of $O_2$, generation of $Cl_2$ is higher than generation of $O_2$ in an electrolyte reaction in seawater.

When the battery is discharged, $O_2$ dissolved in seawater is reduced since it forms NaOH.

When the battery is charged, ICP analysis and ion chromatography analysis were performed in order to determine variation of $Na^+$ and $Cl^-$ ions in the cathode portion, and FIGS. 4 (b) and (c) respectively show the analysis results.

The $Na^+$ and $Cl^-$ ions are reduced in concentration in the seawater as a charge time is increased.

This is because that $Na^+$ ions move to the anode portion and reduction of $Cl^-$ ion concentration is due to generation of $Cl_2$ gas.

When the battery is discharged, NaOH is generated and thus a pH value is increased. In addition, the generation of NaOH can be shown through FT-IR spectrum of FIG. 4(d). After discharge, a metal —OH stretching shape is increased in 3580 $cm^{-1}$.

Figure 5:
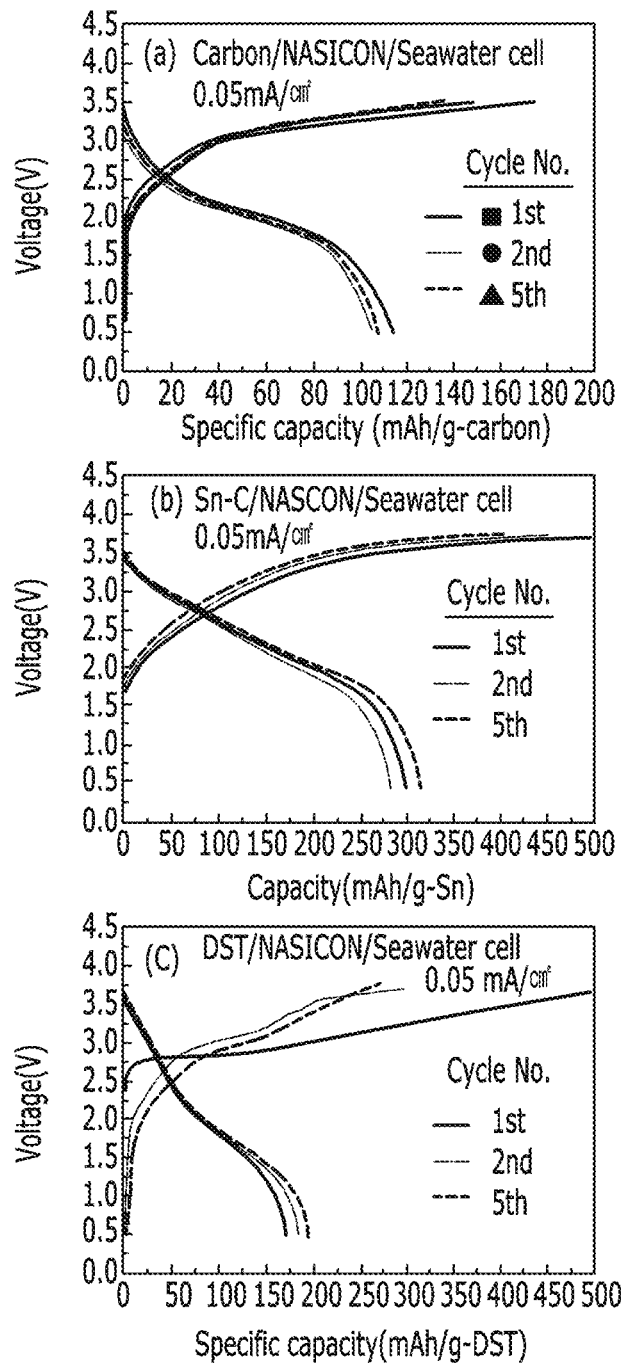
FIG. 5 is a profile according to various cathode materials of a chargeable/dischargeable hybrid seawater battery.

FIG. 5 is a profile according to various anode materials of a charge/discharge hybrid seawater battery.

As shown in FIG. 5 (a), when hard carbon is used as an anode, a very reversible charge/discharge profile is drawn.

When non-reversible capacity of the first cycle was measured to be 60 mAh/g in electrode density of 0.05 mA $cm^{-2}$, discharge capacity was 114.4 mAh/g.

However, as a cycle number is increased, the non-reversible capacity is gradually decreased.

Such an electrochemical phenomenon occurs due to a general characteristic of hard carbon.

The greatest merit of the seawater battery is that sodium can be almost unlimitedly supplied since the cathode has an opened structure.

In FIG. 5 (b), applicability of an alloy, for example, a Sn—C anode was determined.

In case of a Sn-based anode material, $Na_{15}Sn_4$, which is a theoretically intermediate metal, is formed such that capacity of 847 mAh/g could be achieved.

High sodium storage capacity weakens a general cycle characteristic because significant volume change occurs during charge/discharge, and such a problem can be solved by forming a Sn—C compound using amorphous nanoparticles and conductive carbon.

The Sn—C electrode has non-reversible capacity of about 200 mAh/g and reversible capacity of about 300 mAh/g when a full cell is formed.

In general, high non-reversible capacity is relevant to a solid electrolyte interphase (SEI) due to decomposition of electrolyte in the particle surface. In addition, sodiation in the micro-sized compound involves structural deformation.

While the cycle number is sequentially increased, the reversible capacity is increased over 300 mAh/g, and in this case, the non-reversible capacity is continuously decreased. (about 90 mAh/g with reference to 5 cycle)

FIG. 5 (c) shows a result of disodium terephthalate (DST) anode. In case of the DAT anode, 200 mAh/g, which is about 80% of theoretical capacity, can be acquired.

Although non-reversible capacity is high in the first cycle, a reversible reaction occurs as the cycle is increased.

Figure 6:
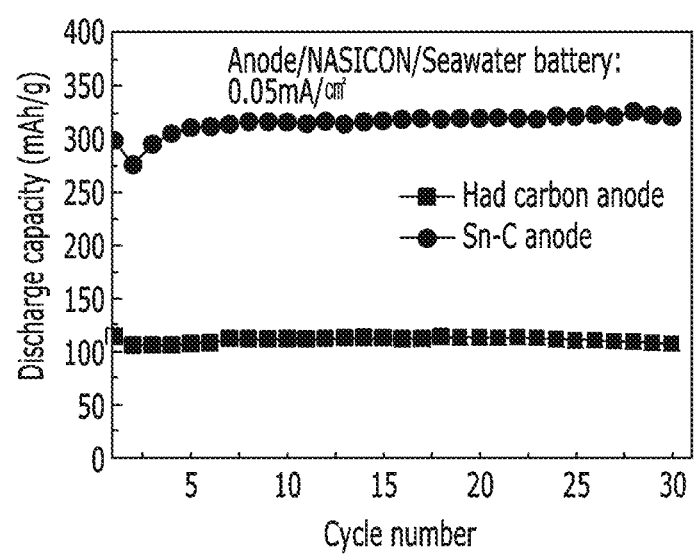
FIG. 6 shows a cycle characteristic result of hard carbon and a Sn—C cathode.

FIG. 6 shows a cycle characteristic result of a hard carbon anode and a Sn—C anode.

In both cases of the hard carbon anode and the Sn—C nano-composite anode, capacity decrease is 0.02% or less even after 30 cycles, that is, they both have stable cycle characteristics.

Such a cycle characteristic is a remarkable result in a seawater battery of which a cathode is opened.

Figure 7:
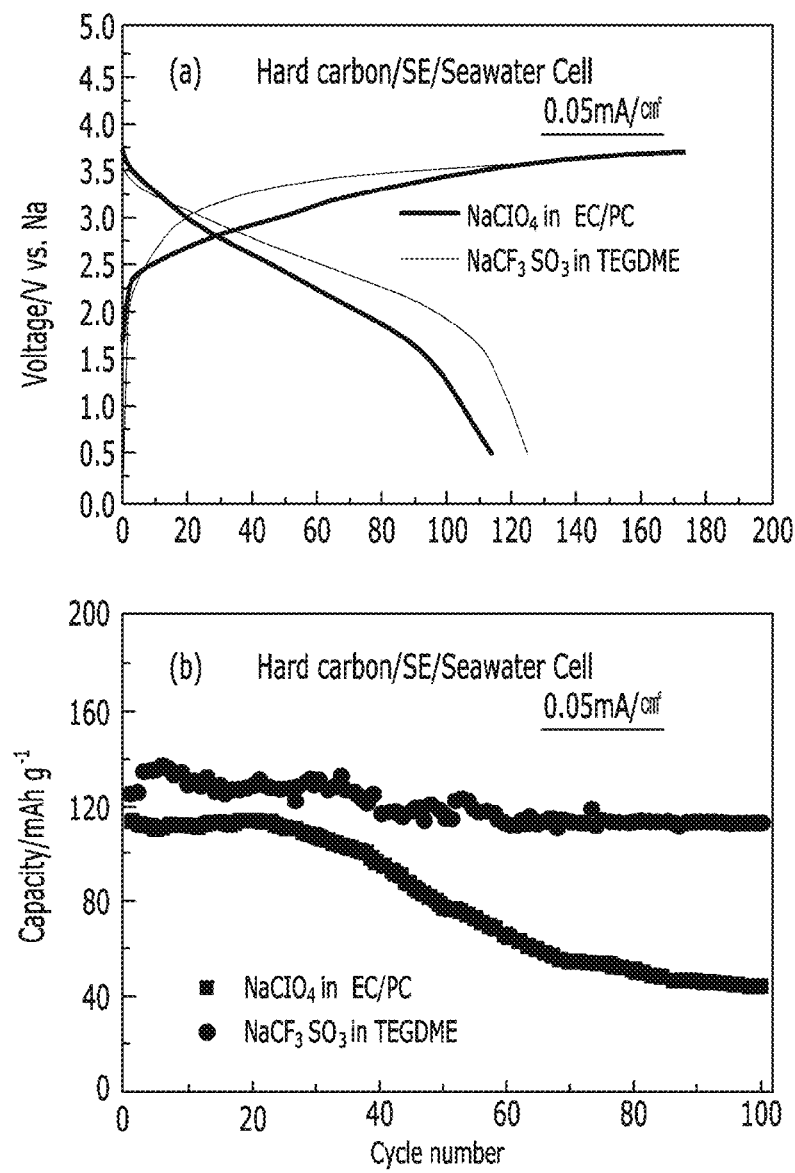
FIG. 7 is a charge and discharge characteristic evaluation result with respect to an EC/PC electrolyte and a TEGDME electrolyte.

FIG. 7 shows a charge/discharge characteristic evaluation result of a seawater battery with respect to ethylene carbonate (EC)/propylene carbonate (PC)-based and triethylene glycol dimethyl ether (TEGDME)-based electrolytes. (hard carbon anode and room temperature)

As shown in FIG. 7, typical flat curves occurred in 3.46 V and 2.26 V, and in 3.55 V and 2.47 V. (a voltage separation ($\Delta V$) of 1.2 V and 1.08V)

Such a result can be understood that cell resistance of the TEGDME-based electrolyte is low and a battery characteristic is more excellent.

When the battery is discharged, TEGDM-based electrolyte utilizes higher active material, and non-reversible capacity is lower than EC/PC-based electrolyte.

As shown in FIG. 7(b), the two electrolytes have stable characteristics until 30 cycles. However, in case of the EC/PC-electrolyte, the characteristic is rapidly decreased from 80 cycles. On the contrary, the TEGDME-electrolyte has a stable characteristic until 100 cycles.

The characteristic of the TEGDME-based electrolyte is low during the first three cycles. In addition, discharge capacity of the TEGDME-based electrolyte is gradually increased because of low permeation characteristic of the electrolyte in hard carbon due to high viscosity of the electrolyte.

That is, the TEGDME-based electrolyte has a more excellent characteristic in the seawater battery.

Such a result of the TEGDME-based electrolyte can be optimized in $NaCF_3SO_3$ salt and a room temperature condition.

Figure 8:
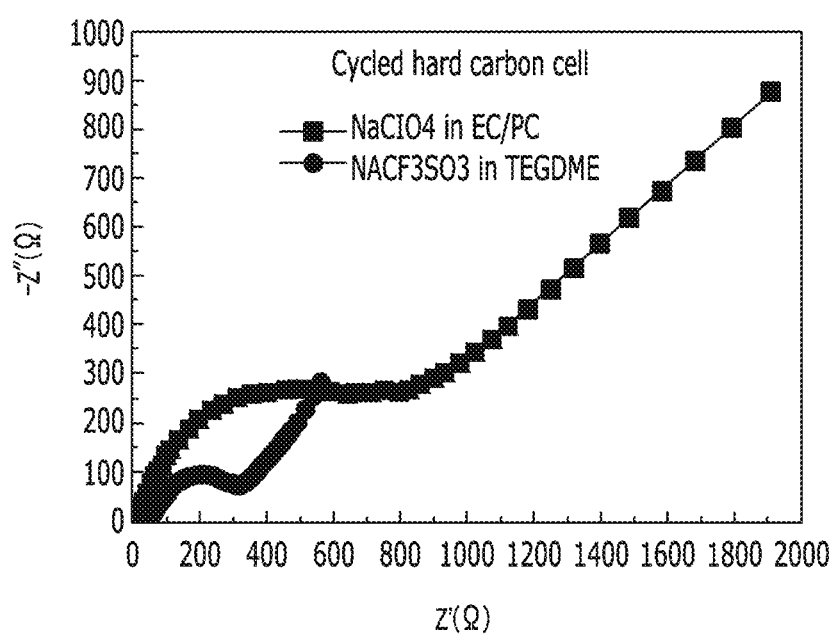
FIG. 8 shows a result of measurement of an interface resistance value with respect to the EC/PC electrolyte and the TEGDME electrolyte.

FIG. 8 shows an interface resistance measurement valve with respect to the EC/PC-based electrolyte and the TEGDME-based electrolyte.

As shown in FIG. 8, the EC/PC-electrolyte has high resistance due to existence of a SEI layer.

In case of a partial electrolyte, $CF_2$ peak may be occurred due to a reaction with a PVdF binder.

Figure 9:
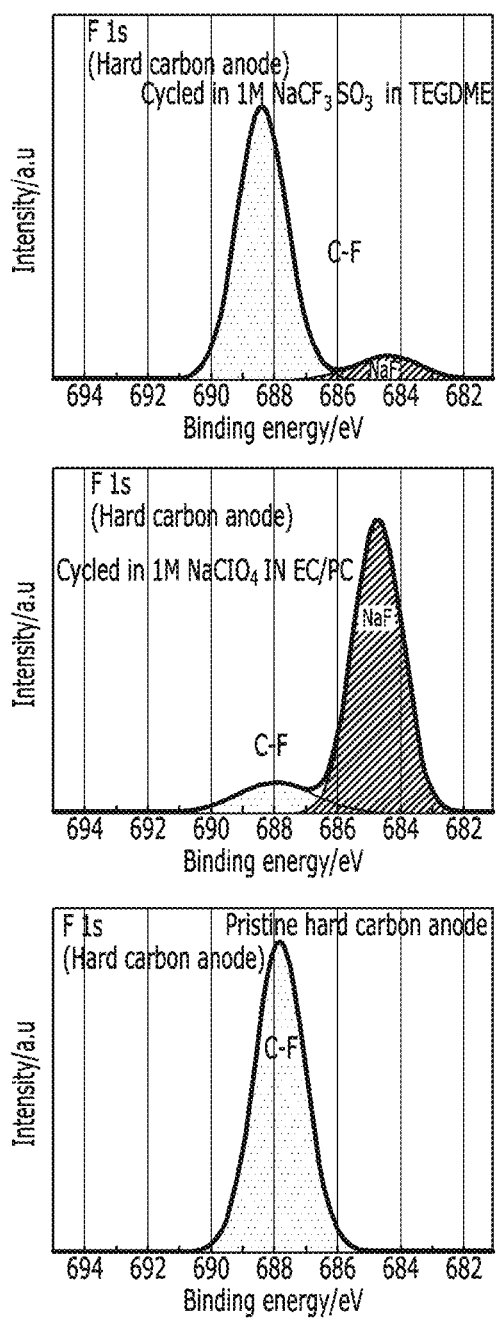
FIG. 9 is a result of F 1s spectrum with respect to the EC/PC electrolyte and the TEGDME electrolyte.

FIG. 9 shows a result of F 1s spectrum with respect to the EC/PC-based electrolyte and the TEGDME-based electrolyte.

As shown in FIG. 9, compared to the TEGDME-based electrolyte, $CF_2$ peak occurs at low binding energy in the EC/PC electrolyte.

This is because that NaF is generated first due to F source in the TEGDME electrolyte and thus binding energy of $CF_2$ is decreased. Accordingly, decomposition of the binder can be suppressed.

On the contrary, in case of the EC/PC-based electrolyte, a decomposition reaction of the binder may occur due to lack of F source in the electrolyte.

It can be derived from the above-stated experiment results that the 1M $NaCF_3SO_3$ condition in the TEGDME electrolyte is more appropriate to the seawater battery.

Sodium Ion Accumulation from Seawater

In order to analyze decomposition of a sodium metal, a pure Ni current collector was used as an initial anode.

Figure 10:
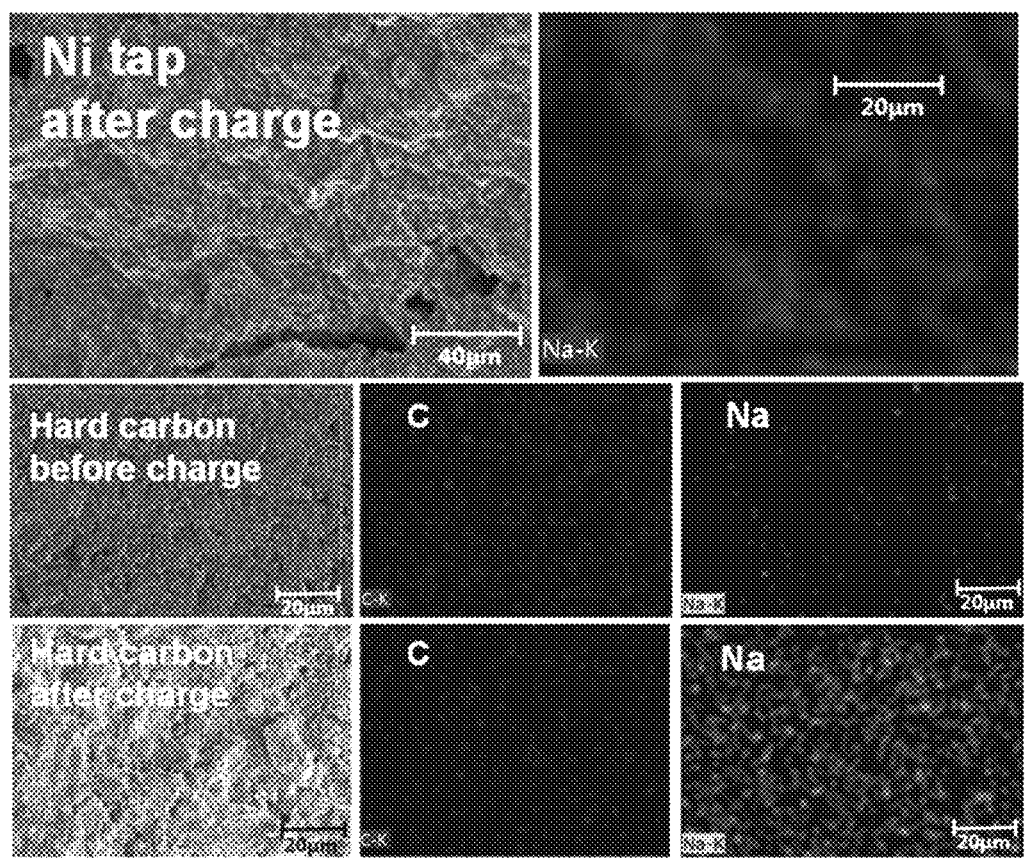
FIG. 10 is an SEM-EDX photo of sodium formed in the surface of a current collector when various anode current collectors of seawater are used.

The upper end photo in FIG. 10 is a SEM photo of sodium formed in the surface of the Ni anode current collected when the seawater battery is charged.

The lower end photo in FIG. 10 is a SEM photo of the surface of an anode when the seawater battery is charged/discharged using a hard carbon anode material.

In the hard carbon anode, sodium was evenly distributed.

Figure 11:
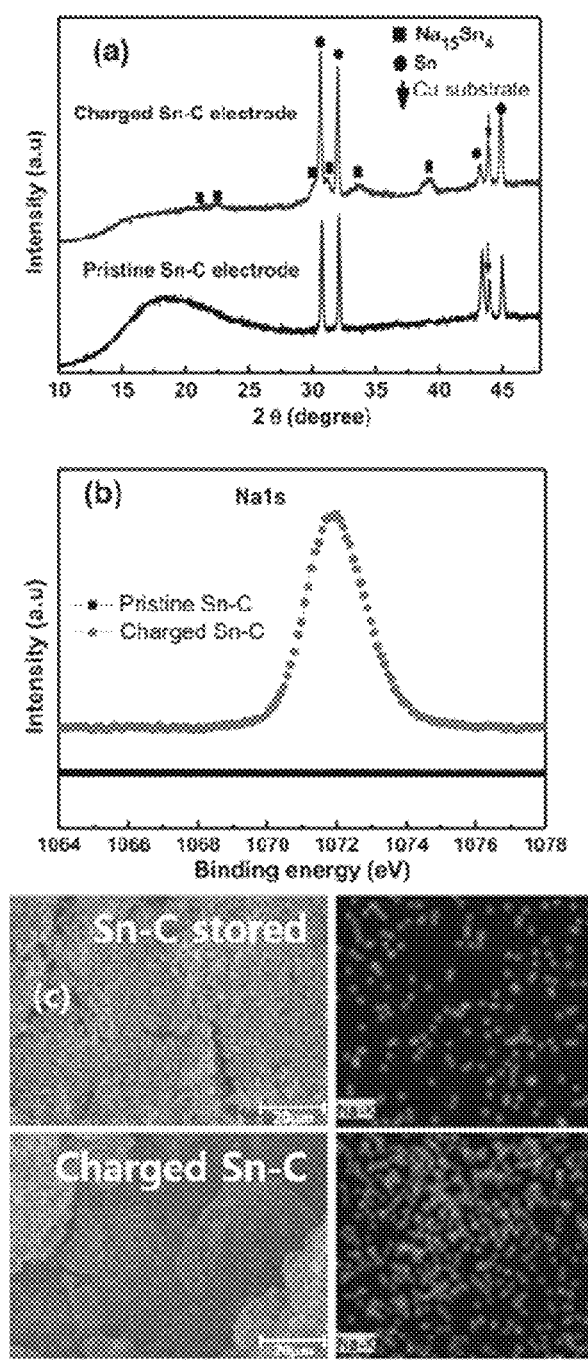
FIG. 11 is a result of XRD, XPS, and SEM-EDX analysis of an anode including a Sn—C anode material.
Figure 12:
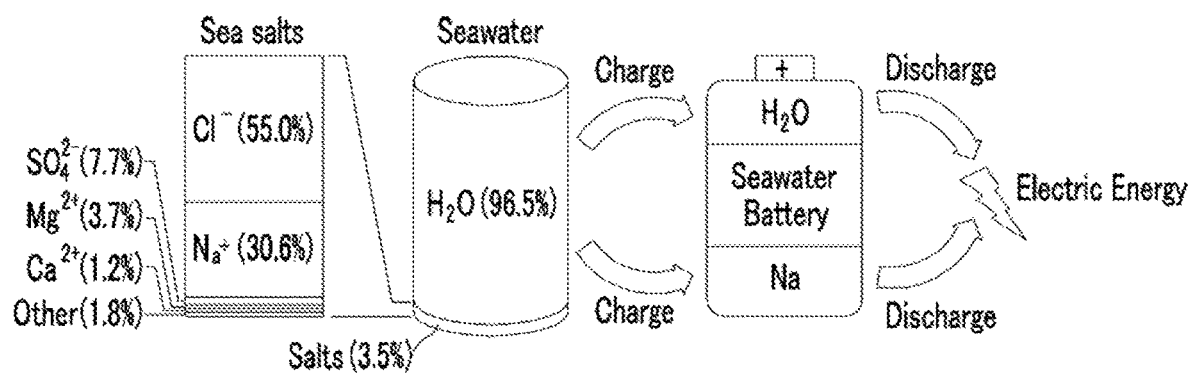
FIG. 12 schematically shows a theory of a rechargeable battery according to Exemplary Embodiment 2 of the present invention.

FIG. 11 shows an analysis result of XRD and SEM of an anode including a Sn—C anode material.

It can be determined in FIG. 11 that a $Na_{15}Sn_4$ shape (JCPDS #31-1327) is formed in an anode from a result of charge/discharge.

As shown in FIG. 11 (a), a side reaction hardly occurs during charge and discharge in the Sn—C anode.

FIG. 11 (b) shows an XPS analysis result of Na 1s. As shown in FIG. 11 (b), a sufficient amount of ions are located in the Sn—C anode when the anode is charged.

FIG. 11 (c) is photos of SEM-EDX analysis when the Sn—C anode is charged/discharged. It can be determined from this photo that sodium is evenly distributed in the charged anode.

It can be derived from the above-stated experiments that an alloy anode material may be an appropriate anode material for a metal-sodium battery.

Exemplary Embodiment 2: Manufacturing of Rechargeable Battery

Manufacturing of Cathode Portion

Carbon paper (Fuel Cell Store, 2050-A) was used as a cathode current collector. Seawater was injected into a cathode container and then the cathode current collector was impregnated in the seawater such that a cathode portion was manufactured.

A porosity of the carbon paper was 28 μm.

Manufacturing of Anode Portion

Stainless steel (McMASTER) was used as a current collector. On the current collector, hard carbon (MTI): super P carbon black (TIMCAL), which is conductive material: poly (terofluoroethylene), which is a binder, were mixed with a ratio of 70:20:10 (wt %) to form an anode active material layer such that an anode was manufactured.

An organic electrolyte is injected into the anode portion and then the manufactured anode was impregnated therein.

The organic electrolyte was manufactured by mixing ethylene carbonate (EC):diethylene carbonate (DEC) (1:1 volume ratio) and 1M of $NaClO_4$ sodium salt (Aldrich).

Manufacturing of Solid Electrolyte

NASICON ($Na_3Zr_2Si_2PO_{12}$) was used as a solid electrolyte. The solid electrolyte was manufactured through a solid-state reaction in the lab. The solid-state reaction is well known to the art and therefore no further description will be provided.

The solid electrolyte was placed between the cathode portion and the anode portion. The solid electrolyte has a thickness of about 1 mm.

Manufacturing of Fresh Water Exhaust Portion

An inlet and an outlet are respectively provided at side surface and a lower end of a containing that forms a cathode portion to supply a sodium-containing solution, and the outlet provided in the lower end of the container was used as a fresh water exhaust portion through which fresh water is exhausted.

An opening/closing valve is provided in the outlet, which is the fresh water exhaust portion, so as to exhaust fresh water in the cathode portion as necessary. A period during which the sodium-containing solution is supplied and charge is started and then finished so that sodium in the cathode portion wholly moves to the anode is set to 1 cycle, and the opening/closing valve is opened for every cycle so as to exhaust fresh water in the cathode portion to the outside.

Experimental Example 2: Evaluation of Battery Characteristic

Charge and Discharge Characteristic Evaluation

Figure 17:
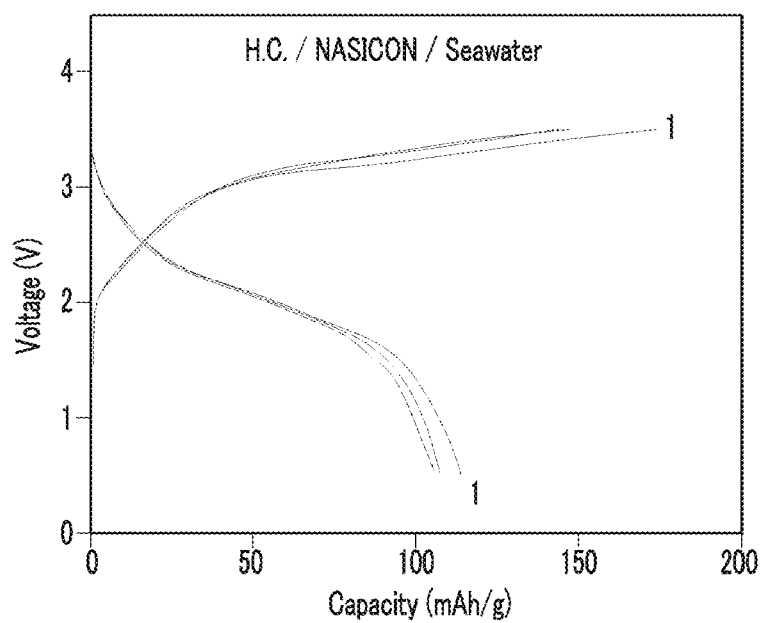
FIG. 17 is a graph illustrating a charge/discharge characteristic of the rechargeable battery according to Exemplary Embodiment 2 of the present invention.

FIG. 17 is a graph illustrating a charge/discharge characteristic of a rechargeable battery according to the present exemplary embodiment.

As shown in FIG. 17, as a seawater battery is charged, sodium ion dissolved in the seawater is accumulated in hard carbon in the anode. The accumulated sodium ion generates electricity when the battery is discharged, and then discharged again to the seawater. In this case, a charge voltage is average of about 3 V, and a discharge voltage is average of about 2.3V. In the first cycle, non-reversible capacity is about 31% at the first cycle, and this indicates the amount of sodium ion consumed to form a solid electrolyte interface (SEI) in the anode surface when sodium ion first moves to the anode. After the SEI is formed, reversible capacity is stable.

Cycle Characteristic Evaluation

Figure 18:
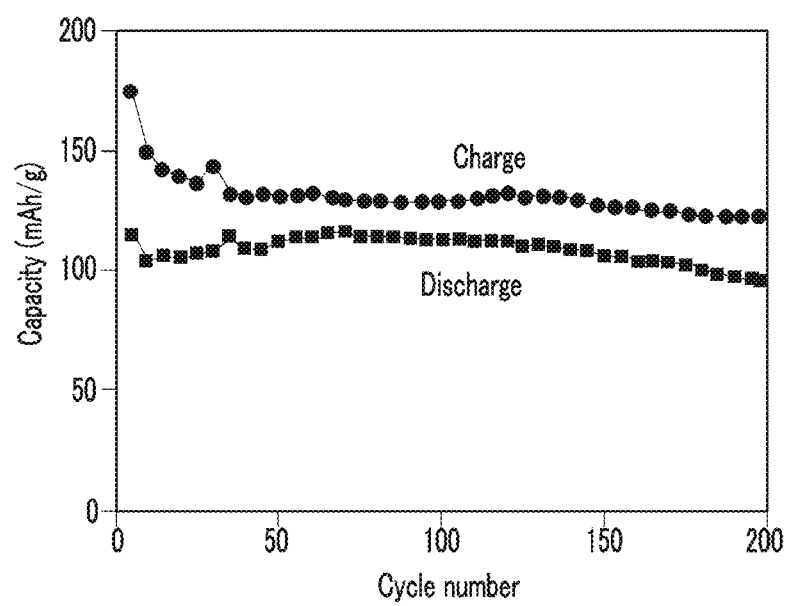
FIG. 18 is a photo illustrating a cycle characteristic of the rechargeable battery according to Exemplary Embodiment 2 of the present invention.

FIG. 18 is a graph illustrating a cycle characteristic of the rechargeable battery according to the present exemplary embodiment.

As shown in FIG. 18, in case of the present exemplary embodiment, reversible capacity is stable after the SEI is formed in the first cycle, and 84% efficiency can be acquired even after about 40 cycles.

Figure 19:
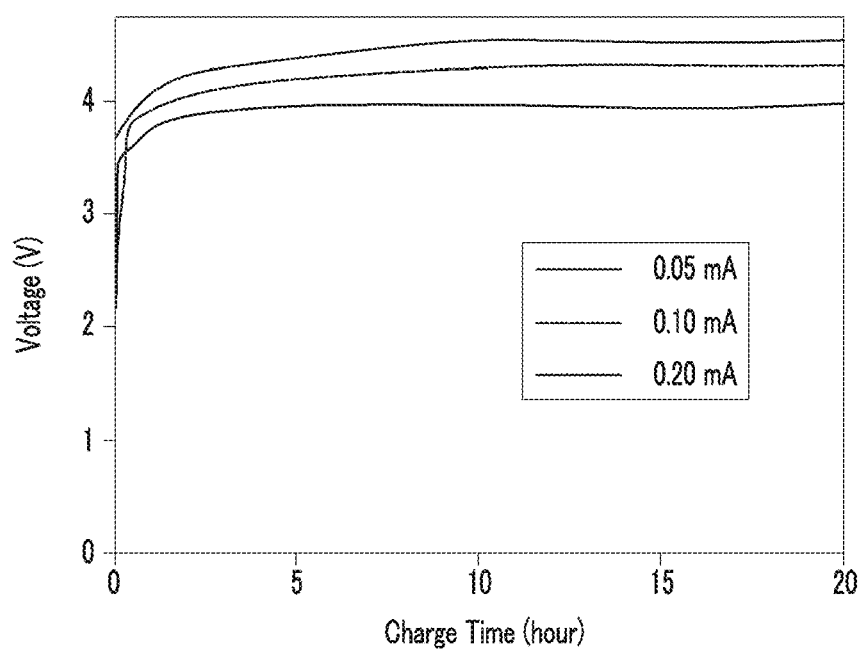
FIG. 19 is a graph illustrating electrical energy efficiency according to scanning speed of the rechargeable battery according to Exemplary Embodiment 2 of the present invention.

FIG. 19 is a graph illustrating electrical energy efficiency according to scanning speed in the rechargeable battery according to the present exemplary embodiment. Voltages were measured while increasing scanning speed to 0.1 mA and 0.2 mA from 0.05 mA. As shown in FIG. 19, 3.98V was measured at 0.05 mA, and 4.32V and 4.54V were respectively measured when the scanning speed was increased to 0.1 mA and 0.2 mA. In order to charge the rechargeable battery according to the present exemplary embodiment, electrical energy of 0.199 mW, 0.432 mW, and 0.0908 mW are needed at 0.05 mA, 0.1 mA, and 0.2 mA, respectively.

Evaluation of Desalination Characteristic

Figure 20:
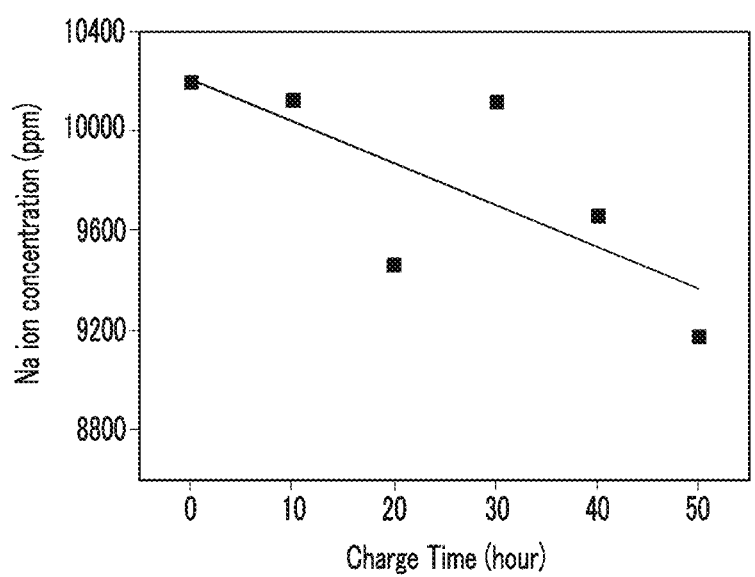
FIG. 20 and FIG. 21 are graphs of concentration of Na ion and Cl ion measured after charge of the rechargeable battery according to Exemplary Embodiment 2 of the present invention.
Figure 21:
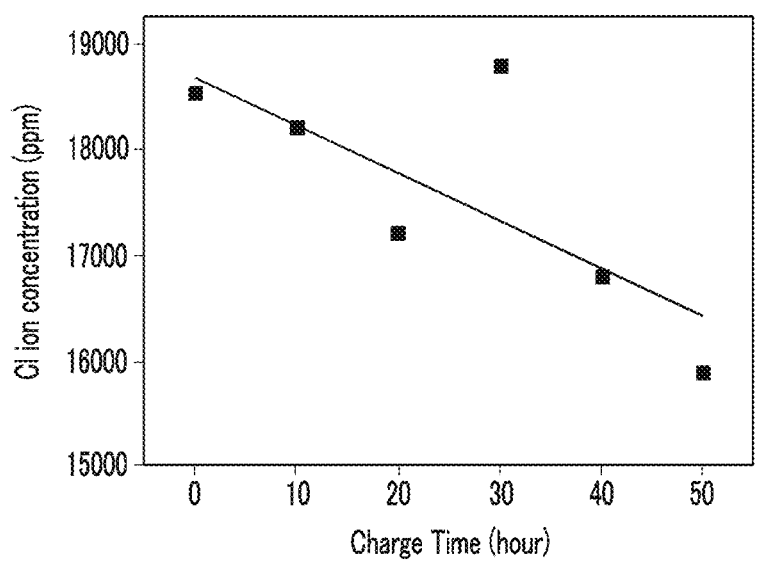

FIG. 20 and FIG. 21 shows Na ion and Cl ion concentration measured by using ion chromatography after the rechargeable battery of the present exemplary embodiment is charged for every 10 hour until 50 hours with scanning speed of 0.2 mA. In the graphs of FIG. 20 and FIG. 21, dots denote measured values and the straight line denotes a compensation value through linear fitting. FIG. 20 shows a measured value of Na ion concentration. As shown in FIG. 20, concentration of Na ion is decreased by about 830 ppm when the rechargeable battery of the present exemplary embodiment is charged. In addition, FIG. 21 shows measured values of Cl ion. As shown in FIG. 21, concentration of Cl ion is decreased by about 2100 ppm. Referring to FIG. 20 and FIG. 21, it can be determined that the Na ion and the Cl ion are consumed to drive the rechargeable battery of the present exemplary embodiment and seawater is desalinated when the rechargeable battery is charged.

Figure 22:
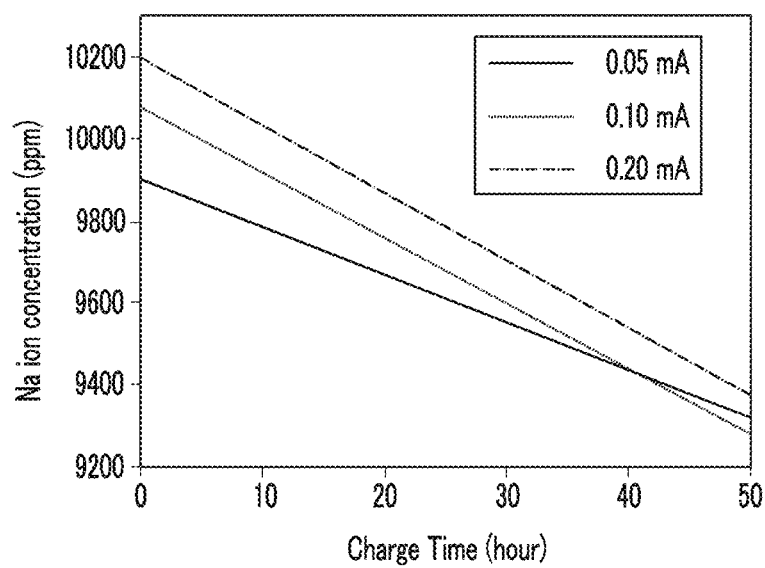
FIG. 22 and FIG. 23 are graphs of fresh water efficiency according to scanning speed of the rechargeable battery according to Exemplary Embodiment 2 of the present invention.
Figure 23:
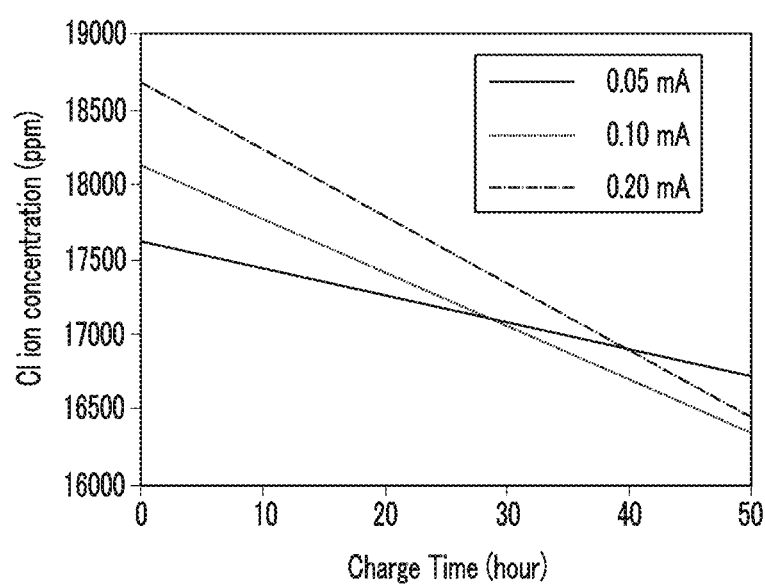

FIG. 22 and FIG. 23 show desalination efficiency according to the scanning speed of the rechargeable battery of the present exemplary embodiment. Concentration was measured for every 10 hour during 50 hours while increasing the scanning speed to 0.1 mA and 0.2 mA from 0.05 mA. In FIG. 22 and FIG. 23, Na ion concentration and Cl ion concentration are respectively measured using IC. In the graphs of FIG. 22 and FIG. 23, the straight line was drawn after linear fitting is performed.

In FIG. 22, a slope absolute value of 0.05 mA is 11.94, and the slope absolute value is increased to 16.00 and 16.63 as the scanning speed is increased to 0.1 mA and 0.2 mA. In addition, in FIG. 23, a slope absolute value is 18.51 at the scanning speed of 0.05 mA and the absolute value is increased to 36.00 and 45.29 as the scanning speed is increased to 0.1 mA and 0.2 mA, respectively. Thus, it can be determined that desalination efficiency can be increased by introducing high electrical energy by increasing scanning speed.

Exemplary Embodiment 3: Manufacturing of Rechargeable Battery

Manufacturing of Cathode Portion

Carbon paper (Fuel Cell Store, 2050-A) was used as a current collector. Seawater was injected into a cathode container and then the current collector was impregnated in the seawater such that a cathode portion was manufactured.

A porosity of the carbon paper was 28 μm.

Manufacturing of Anode Portion

Stainless steel (McMASTER) was used as a current collector. On the current collector, hard carbon (MTI): super P carbon black (TIMCAL), which is conductive material: poly (terofluoroethylene), which is a binder, were mixed with a ratio of 70:20:10 (wt %) to form an anode active material layer such that an anode was manufactured.

An organic electrolyte is injected into the anode portion and then the manufactured anode was impregnated therein.

The organic electrolyte was manufactured by mixing ethylene carbonate (EC):diethylene carbonate (DEC) (1:1 volume ratio) and 1M of $NaClO_4$ sodium salt (Aldrich).

Manufacturing of Solid Electrolyte

NASICON ($Na_3Zr_2Si_2PO_{12}$) was used as a solid electrolyte. The solid electrolyte was manufactured through a solid-state reaction in the lab. The solid-state reaction is well known to the art and therefore no further description will be provided.

The solid electrolyte was placed between the cathode portion and the anode portion. The solid electrolyte has a thickness of about 1 mm.

Manufacturing of Hydrogen Exhaust Portion

A gas pipe is provided in an upper end of a container that forms the cathode portion in a connected manner so as to exhaust hydrogen and an opening/closing valve is provided in one side of the gas pipe to exhaust hydrogen generated in the cathode portion as necessary. While discharge is started and then finished while a sodium-containing solution is supplied in the cathode portion and discharge is performed, the opening/closing valve is opened to draw out hydrogen in the cathode portion to the outside.

Experimental Example 3: Battery Characteristic Evaluation

Charge and Discharge characteristics Evaluation

Figure 25:
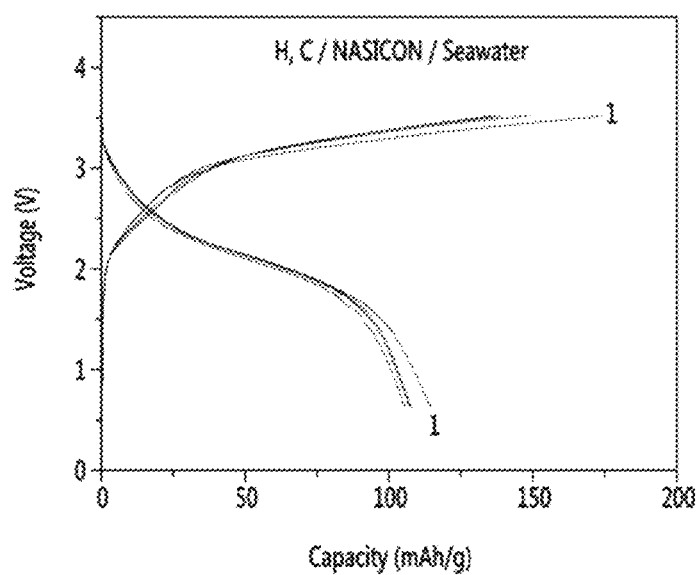
FIG. 25 is charge and discharge data of the rechargeable battery according to Exemplary Embodiment 3 of the present invention.

FIG. 25 is charge/discharge data of a rechargeable battery according to an exemplary embodiment of the present invention.

As shown in FIG. 25, sodium ion dissolved in seawater is accumulated in hard carbon in an anode when a seawater battery is charged. The accumulated sodium ion is discharged to seawater while generating electricity when the rechargeable battery is discharged. A charge voltage is average of about 3 V and a discharge voltage is average of about 2.3V. Non-reversible capacity is about 31% at the first cycle, and this indicates the amount of sodium ion consumed to form a solid electrolyte interface (SEI) in the anode surface when sodium ion first moves to the anode. After the SEI is formed, reversible capacity is stable.

Cycle Characteristic Evaluation

Figure 26:
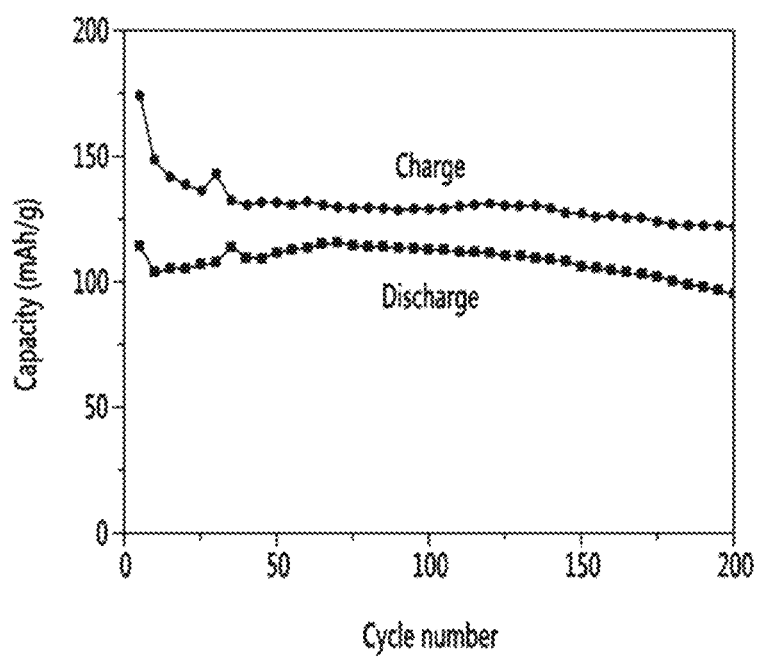
FIG. 26 is cycle characteristic data of the rechargeable battery according to Exemplary Embodiment 3 of the present invention.

FIG. 26 is cycle characteristic data of the rechargeable battery according to the exemplary embodiment of the present invention.

As shown in FIG. 26, reversible capacity is stable after forming of SEI in the first cycle, and efficiency of 84% can be acquired even after about 40 cycles.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims. Therefore, the aforementioned embodiments should be understood to be exemplary but not limiting the present invention in any way.

What is claimed is:

1. A rechargeable battery comprising:
    a cathode portion including a sodium-containing solution and a cathode current collector, which is immersed within the sodium-containing solution;

an anode portion including a liquid organic electrolyte, an anode current collector immersed within the liquid organic electrolyte, and an anode active material layer comprising an anode active material provided on an outer surface of the anode current collector; and a solid electrolyte provided between the cathode portion and the anode portion, wherein a first side of the cathode portion comprises an inlet of the sodium-containing solution, wherein a second side of the cathode portion comprises an outlet of a material generated from the sodium-containing solution by charge or discharge of the rechargeable battery, wherein the organic electrolyte in the anode portion comprises a non-aqueous organic solvent and NaTFSI as sodium salt, wherein concentration of the NaTFSI as the sodium salt is 0.1M to 2.0M, wherein the anode active material layer provided in the outer surface of the anode current collector further comprises a conductive material and a binder, and wherein the anode active material comprises DST (disodium terephthalate), a Cu-based, P-based, Sn-based, carbon-based material and a sodium intercalation material.

2. The rechargeable battery of claim 1, wherein the sodium containing solution comprises seawater, and wherein the material comprises NaOH generated by the discharge of the rechargeable battery or desalinated water generated by the charge of the rechargeable battery.

3. The rechargeable battery of claim 1, wherein the non-aqueous organic solvent is an ester-based, ether-based, ketone-based, or alcohol-based solvent, an aprotic solvent, or a combination thereof, and the sodium salt further comprises at least one selected from the group consisting of $NaClO_4$, $NaPF_4$, $NaPF_6$, $NaAsF_6$, $Na[(C_2F_5)_3PF_3]$(NaFAP), $Na[B(C_2O_4)_2]$(NaBOB), $Na[N(SO_2F)_2]$(NaFSI), and Na Beti ($NaN[SO_2C_2F_5]_2$).

4. The rechargeable battery of claim 1, wherein the n-type organic material is aniline/o-nitroaniline, disodium terephthalate, aromatic dialdehyde, terephthalaldehyde, 3,4,9,10-perylene-tetracarboxylicacid-dianhydride (PTCDA), poly(2,2,6,6-tetramethylpiperidinyloxy-4-ylmethacrylate) (PTMA), or a derivative or mixture thereof.

5. The rechargeable battery of claim 1, wherein the Cu-based, P-based, and Sn-based material is CuO, CuO/C, P, P/C, Sn, Sn/C, Sn/P, or a combination thereof.

6. The rechargeable battery of claim 1, wherein the carbon-based material is natural graphite, artificial graphite, soft carbon, hard carbon, or a combination thereof.

7. The rechargeable battery of claim 1, wherein sodium intercalation material is $Li_4Ti_5O_{12}$, $NaCo_2O_4$, $Na_2Ti_3O_7$, $Fe_3O_4$, $TiO_2$, $Sb_2O_4$, a Sb/C composite, a SnSb/C composite, amorphous P/C composite, or a combination thereof.

8. The rechargeable battery of claim 1, wherein the conductive material comprises at least one selected from the group consisting of:

a carbon-based material that comprises at least one selected from the group consisting of natural graphite, artificial graphite, carbon black, acetylene black, ketjen black, vapor-grown carbon fiber (VGCF), and carbon fiber;

a metal powder that comprises at least one selected from the group consisting of copper, nickel, aluminum, and silver;

metal fiber; and a conductive polymer.

9. The rechargeable battery of claim 1, wherein the binder is polyvinyl alcohol, carboxymethyl cellulose, hydroxypropylcellulose, polyvinyl chloride, carboxylated polyvinyl chloride, polyvinyl fluoride, a polymer including ethylene oxide, polyvinyl pyrrolidone, polyurethane, polytetrafluoroethylene, polyvinylidene fluoride, polyethylene, polypropylene, styrene butadiene rubber, acrylated styrene-butadiene rubber, an epoxy resin, nylon, or a combination thereof.

10. The rechargeable battery of claim 1, wherein the solid electrolyte comprises an amorphous ion conductive material (phosphorus-based glass, oxide-based glass, oxide/sulfide based glass), a Na superionic conductor (NASICON), a sodium sulfide-based solid electrolyte, a sodium oxide-based solid electrolyte, a $PEO-NaClO_4$ polymer solid electrolyte, or a combination thereof.

11. The rechargeable battery of claim 1, wherein the cathode current collector is carbon paper, carbon fiber, carbon fabric, carbon felt, metal membrane, or a combination thereof.

12. The rechargeable battery of claim 1, wherein a porosity range of the cathode current collector is 1 μm to 250 μm.

13. The rechargeable battery of claim 1, wherein Reaction Equation 1 and/or Reaction Equation 2 occurs in the cathode portion when the rechargeable battery is discharged:

$$Na^+ + H_2O + e^- \rightarrow NaOH + \tfrac{1}{2}H_2 \quad \text{[Reaction Equation 1]}$$

$$Na^+ + \tfrac{1}{2}H_2O + \tfrac{1}{4}O_2 + e^- \rightarrow NaOH. \quad \text{[Reaction Equation 2]}$$

14. The rechargeable battery of claim 1, wherein Reaction Equation 3 and/or Reaction Equation 4 occurs in the cathode portion when the rechargeable battery is charged:

$$NaCl \rightarrow Na + \tfrac{1}{2}Cl_2 \quad \text{[Reaction Equation 3]}$$

$$NaOH \rightarrow Na + \tfrac{1}{2}H_2O + \tfrac{1}{4}O_2. \quad \text{[Reaction Equation 4]}$$

15. The rechargeable battery of claim 1, wherein the sodium-containing solution is seawater.

16. The rechargeable battery of claim 1, wherein the outlet comprises a fresh water exhaust portion connected to the cathode portion to draw out fresh water generated in the cathode portion to the outside.

17. The rechargeable battery of claim 16, wherein the fresh water exhaust portion comprises an exhaust pipe provided in a cathode portion and selectively opened to exhaust fresh water while or after the battery is charged.

18. The rechargeable battery of claim 1, further comprising a hydrogen exhaust portion connected to the cathode portion to draw out hydrogen generated in the cathode portion from discharge of the battery to the outside.

19. The rechargeable battery of claim 18, wherein the hydrogen exhaust portion comprises a gas pipe provided in an upper end of the cathode portion and selectively opened while or after the battery is discharged so as to exhaust hydrogen.

* * * * *